US012173884B2

(12) United States Patent
Baldwin et al.

(10) Patent No.: US 12,173,884 B2
(45) Date of Patent: Dec. 24, 2024

(54) UNDERWATER LIGHT ASSEMBLY AND METHOD

(71) Applicant: Pentair Water Pool and Spa, Inc., Cary, NC (US)

(72) Inventors: Travis Baldwin, Cary, NC (US); Robert J. Netzel, Sr., Spring Hill, FL (US); William Evans, Apex, NC (US); Michael McIntyre, Chapel Hill, NC (US); Azur Dzindo, Woodland Hills, CA (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 0 days.

(21) Appl. No.: 18/183,904

(22) Filed: Mar. 14, 2023

(65) Prior Publication Data

US 2023/0213178 A1 Jul. 6, 2023

Related U.S. Application Data

(63) Continuation of application No. 17/305,558, filed on Jul. 9, 2021, now Pat. No. 11,603,986.
(Continued)

(51) Int. Cl.
*F21V 31/00* (2006.01)
*F21S 10/00* (2006.01)
(Continued)

(52) U.S. Cl.
CPC ............ *F21V 31/005* (2013.01); *F21S 10/00* (2013.01); *F21S 10/002* (2013.01); *F21V 5/007* (2013.01);
(Continued)

(58) Field of Classification Search
CPC ........ F21V 31/00; F21V 31/005; F21V 5/007; F21V 19/003; F21S 10/00; F21S 10/002;
(Continued)

(56) References Cited

U.S. PATENT DOCUMENTS

| | | | |
|---|---|---|---|
| 6,184,628 | B1 | 2/2001 | Ruthenberg |
| 7,125,146 | B2 | 10/2006 | Willis et al. |

(Continued)

FOREIGN PATENT DOCUMENTS

| | | | |
|---|---|---|---|
| EP | 1460333 | A1 | 9/2004 |
| EP | 1781072 | A2 | 5/2007 |
| EP | 3936758 | A1 | 1/2022 |

OTHER PUBLICATIONS

Extended European Search Report, European Patent Application No. 21184835.3, dated Nov. 12, 2021, 9 pages.
(Continued)

*Primary Examiner* — Alan B Cariaso
(74) *Attorney, Agent, or Firm* — Husch Blackwell LLP

(57) ABSTRACT

An underwater directional light is provided. The directional light includes a lamp assembly, a tube assembly, and a printed circuit board assembly. The lamp assembly includes a housing and a lamp having a plurality of lighting elements. The tube assembly is coupled to the lamp and has a hollow interior. The printed circuit board assembly is mechanically coupled to the tube assembly and electrically coupled to the lamp.

20 Claims, 25 Drawing Sheets

Related U.S. Application Data

(60) Provisional application No. 62/705,660, filed on Jul. 9, 2020.

(51) Int. Cl.

| | |
|---|---|
| ***F21V 5/00*** | (2018.01) |
| ***F21V 19/00*** | (2006.01) |
| ***F21W 131/401*** | (2006.01) |
| ***F21Y 103/10*** | (2016.01) |
| ***F21Y 107/40*** | (2016.01) |
| ***F21Y 113/10*** | (2016.01) |
| ***F21Y 113/13*** | (2016.01) |
| ***F21Y 115/10*** | (2016.01) |

(52) U.S. Cl.
CPC ............ *F21V 19/003* (2013.01); *F21V 31/00* (2013.01); *F21W 2131/401* (2013.01); *F21Y 2103/10* (2016.08); *F21Y 2107/40* (2016.08); *F21Y 2113/10* (2016.08); *F21Y 2113/13* (2016.08); *F21Y 2115/10* (2016.08)

(58) Field of Classification Search
CPC .......... F21W 2131/401; F21Y 2107/40; F21Y 2107/50; F21Y 2113/10; F21Y 2113/13; F21Y 2115/10; F21Y 2103/10
See application file for complete search history.

(56) References Cited

U.S. PATENT DOCUMENTS

| | | | | |
|---|---|---|---|---|
| 7,628,512 | B2 | 12/2009 | Netzel et al. | |
| 8,172,434 | B1 | 5/2012 | Olsson | |
| 9,453,635 | B1 * | 9/2016 | Fuller | F21V 23/005 |
| 11,603,986 | B2 * | 3/2023 | Baldwin | F21S 10/00 |
| 2005/0248944 | A1 * | 11/2005 | Sloan | H05B 45/46 362/234 |
| 2006/0176686 | A1 | 8/2006 | McVicker | |
| 2007/0097675 | A1 | 5/2007 | Koren et al. | |
| 2007/0279900 | A1 * | 12/2007 | Bauer | F21V 23/02 362/158 |
| 2015/0233565 | A1 | 8/2015 | Lee | |
| 2022/0186921 | A1 * | 6/2022 | Raposo | F21V 3/10 |

OTHER PUBLICATIONS

Communication pursuant to Rule 69 EPC issued by the European Patent Office dated Jan. 17, 2022, 2 pages.

* cited by examiner

UNDERWATER LIGHT ASSEMBLY AND METHOD

CROSS-REFERENCE TO RELATED APPLICATIONS

This Application claims priority to U.S. Provisional Patent Application Ser. No. 62/705,660, filed on Jul. 9, 2020, entitled "Underwater Light Assembly and Method", and U.S. patent application Ser. No. 17/305,558 filed on Jul. 9, 2021, the entire disclosures of which is incorporated herein by reference.

BACKGROUND

Underwater pool lights are used in swimming pools, wading pools, fountains, and spas for illumination under the surface of the water. Conventional underwater lighting systems use a lens to direct the light emitted from a light source, such as an incandescent lamp. However, in underwater applications, when the only mechanism used for managing light distribution is lensing, light can be ineffectively dispersed. This is because the index of refraction of the lens is more like that of water than that of air. Thus, although lensed underwater lights are useful in many applications, lensing has inherent shortcomings including limited beam angles, flare, spherical and chromatic aberrations, etc.

In some cases, conventional underwater lens lighting can achieve some light distribution management by including an air gap between the light source and the back of the lens. However, the air gap insulates the heat generated by the lamp, which may introduce other challenges.

SUMMARY

Some embodiments provide an underwater light that includes a lamp assembly, a tube assembly coupled to the lamp assembly, and a printed circuit board (PCB) assembly. The lamp assembly can include a housing and a lamp, the lamp having a plurality of lighting elements. The tube assembly can have a substantially hollow interior. The PCB assembly can be mechanically coupled to the tube assembly and electrically coupled to the lamp assembly. Each of the plurality of lighting elements can correspond to a window, and the windows can be arranged on the lamp assembly in a plurality of non-parallel planes. In some instances, each of the windows is arranged on a plane that is not parallel with the plane on which any of the other windows are arranged. In other instances, each of the windows is arranged on a plane that is not coplanar and is not parallel with the plane on which any of the other windows are arranged.

An underwater light designed to project light onto a surface is provided. The light includes a housing defining a cavity therein and a first circuit board including a first plurality of rows of light-emitting diodes (LEDs). The first circuit board is located within the cavity defined by the housing. The light further includes a first refractor assembly including a first plurality of rows of refractors, the first refractor assembly being coupled to the first circuit board. The underwater light is configured to produce a first light distribution on a first region of the surface having a first red-green-blue (RGB) ratio, and a second light distribution on a second region of the surface having a second RGB ratio.

In another embodiment, an underwater light includes a housing having a substantially dome shaped lens coupled to a back housing through a sealing gasket, the housing defining a cavity therein. A first circuit board including a first plurality of rows of light-emitting diodes (LEDs) is provided and is located within the cavity defined by the housing. A second circuit board having a second plurality of rows of LEDs is also provided and is located within the cavity defined by the housing and is electrically coupled to the first circuit board. A third circuit board having a third plurality of rows of LEDs is further provided and is located within the cavity defined by the housing and is electrically coupled to the first circuit board. The light also includes a first refractor assembly including a first plurality of rows of refractors, the first refractor assembly located adjacent to the first circuit board, a second refractor assembly having a second plurality of rows of refractors located adjacent to the second circuit board, and a third refractor assembly having a third plurality of rows of refractors located adjacent to the third circuit board. The underwater light is configured to produce a first light distribution on a first region of a surface having a first red-green-blue (RGB) ratio, a second light distribution on a second region of the surface having a second RGB ratio, and a third light distribution on a third region of the surface having a third RGB ratio.

DETAILED DESCRIPTION

Figure 1A:
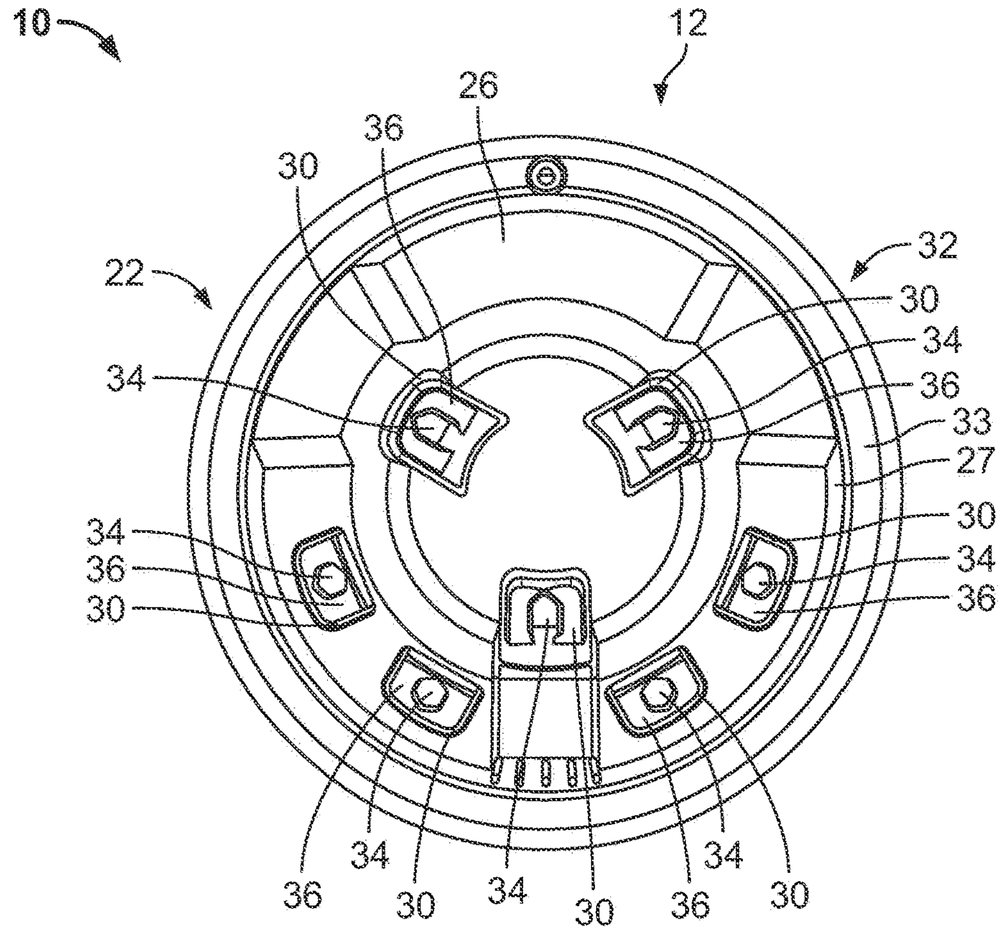
FIG. 1A is a front elevational view of an underwater light according to one embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIGS. 1-4 illustrate an underwater light 10 according to one embodiment. The underwater light 10 is designed to be at least partially submerged under a body of water in an aquatic application, such us, for example, swimming pools, wading pools, fountains, spas, and other aquatic applications. The underwater light 10 can include two interconnected portions provided in the form of a lamp assembly 12 and a tube assembly 14. The lamp assembly 12 and the tube assembly 14 can be joined together by various joining methods, such as, for example, ultrasonic, vibratory, hot plate, laser welding, or the like. In some forms, the lamp assembly 12 and the tube assembly 14 include corresponding parts of a mechanical coupling. For example, one of the lamp assembly 12 or the tube assembly 14 can include a first half of a hermetically sealing, one-way snap fit joint, and the other of the lamp assembly 12 and the tube assembly 14 can include a second, corresponding half of the one-way snap fit joint. In the foregoing example, the lamp assembly 12 and the tube assembly 14 can be manufactured and manipulated independently, and then joined via the snap fit joint in a substantially water-tight configuration for use underwater.

Figure 1B:
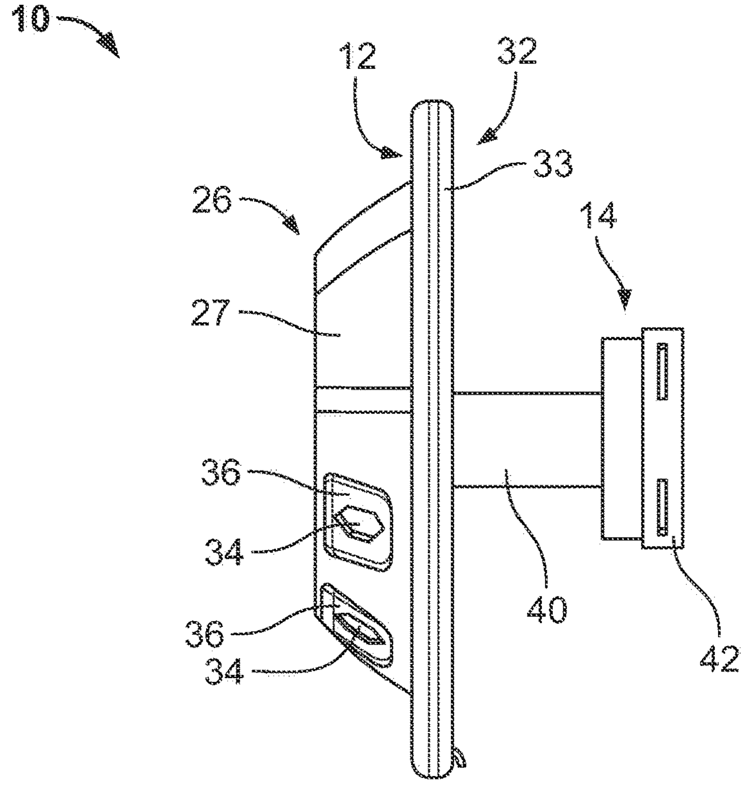
FIG. 1B is a side elevational view of the underwater light of FIG. 1A.
Figure 2:
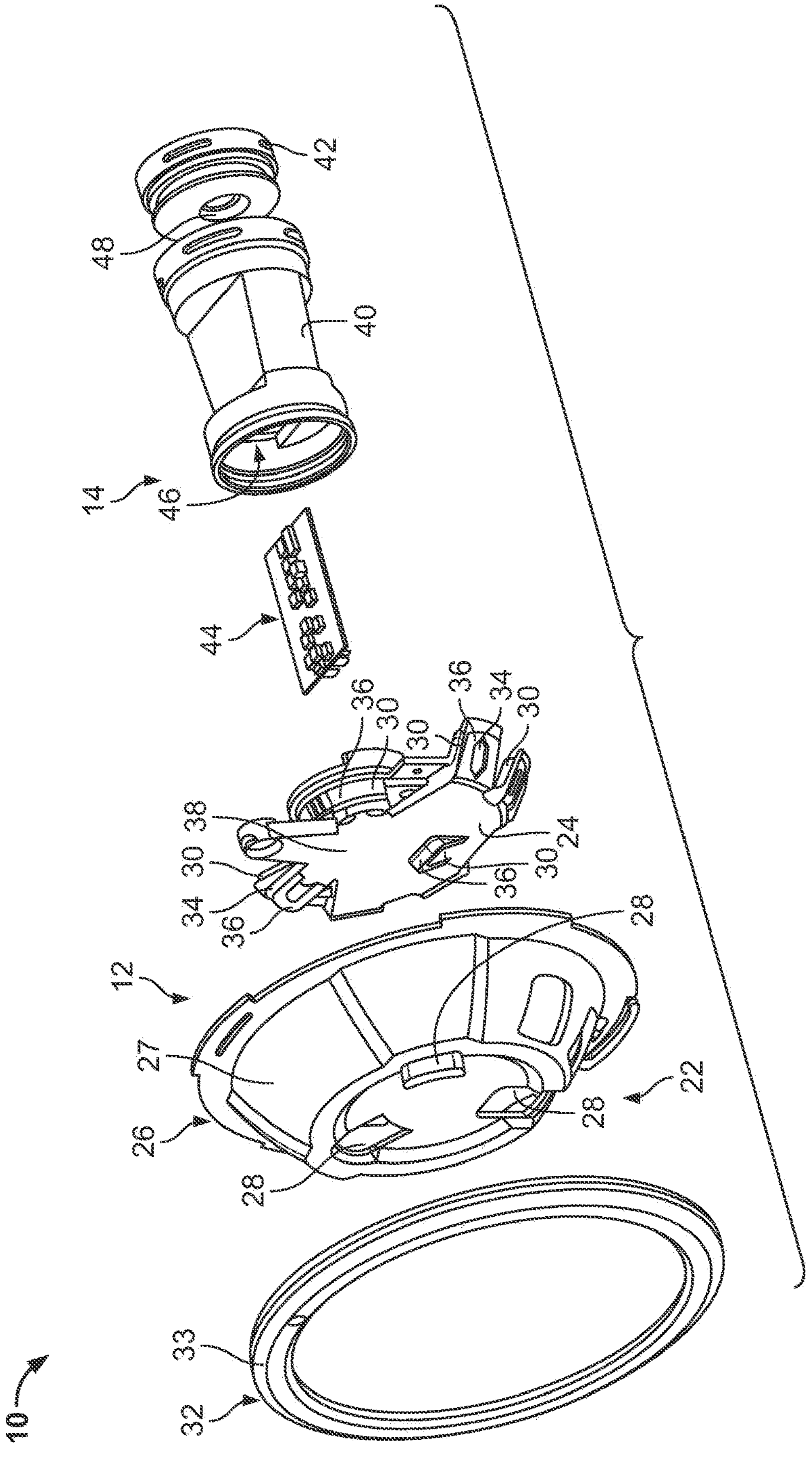
FIG. 2 is an exploded isometric view of the underwater light of FIG. 1A.

As best seen in FIG. 2, the lamp assembly 12 can include a lamp housing 22 and a lamp 24. The lamp housing 22 can include an integrating disc 26 and a lamp attachment fitting 32. The integrating disc 26 is designed to provide an exterior face of the underwater light 10. The integrating disc 26 is provided in the form of a substantially dome shaped sidewall 27 with a plurality of cutouts 28 that correspond to the physical arrangement of a plurality of lighting elements 30. When assembled, each of the lighting elements 30 extends through the corresponding cutout 28 of the integrating disc 26. Thus, the integrating disc 26 can act as a shell or mask that covers and is positioned over the lamp 24. For example, as shown in FIGS. 1A, 1B, and 2, the integrating disc 26 includes seven openings that are each sized and shaped to receive the corresponding lighting element 30. Furthermore, the integrating disc 26 can include a variety of decorative ornamentation to enhance the visual appeal of the underwater light 10.

The lamp housing 22 can also include the lamp attachment fitting 32. The lamp attachment fitting 32 is provided in the form of a ring 33 that is designed to mechanically couple the lamp assembly 12 to a niche or other underwater lighting or plumbing fixture of a pool, spa, or other body of water, such as a return fitting. In some applications, the lamp attachment fitting 32 and the integrating disc 26 each include a rotatable coupling structure designed to interact with each other. During installation, the lamp attachment fitting 32 and the integrating disc 26 can, therefore, be rotatably secured to an underwater lighting fixture and provide rotational positioning during installation. It is generally known that conventional pool and spa lighting fixtures installed during pool construction, for example, may have non-ideal rotational positioning. Due to the directional lighting features of the present invention, the integrating disc 26 and the lamp attachment fitting 32 allow for rotational movement until the underwater light 10 is secured into its final position.

Figure 3:
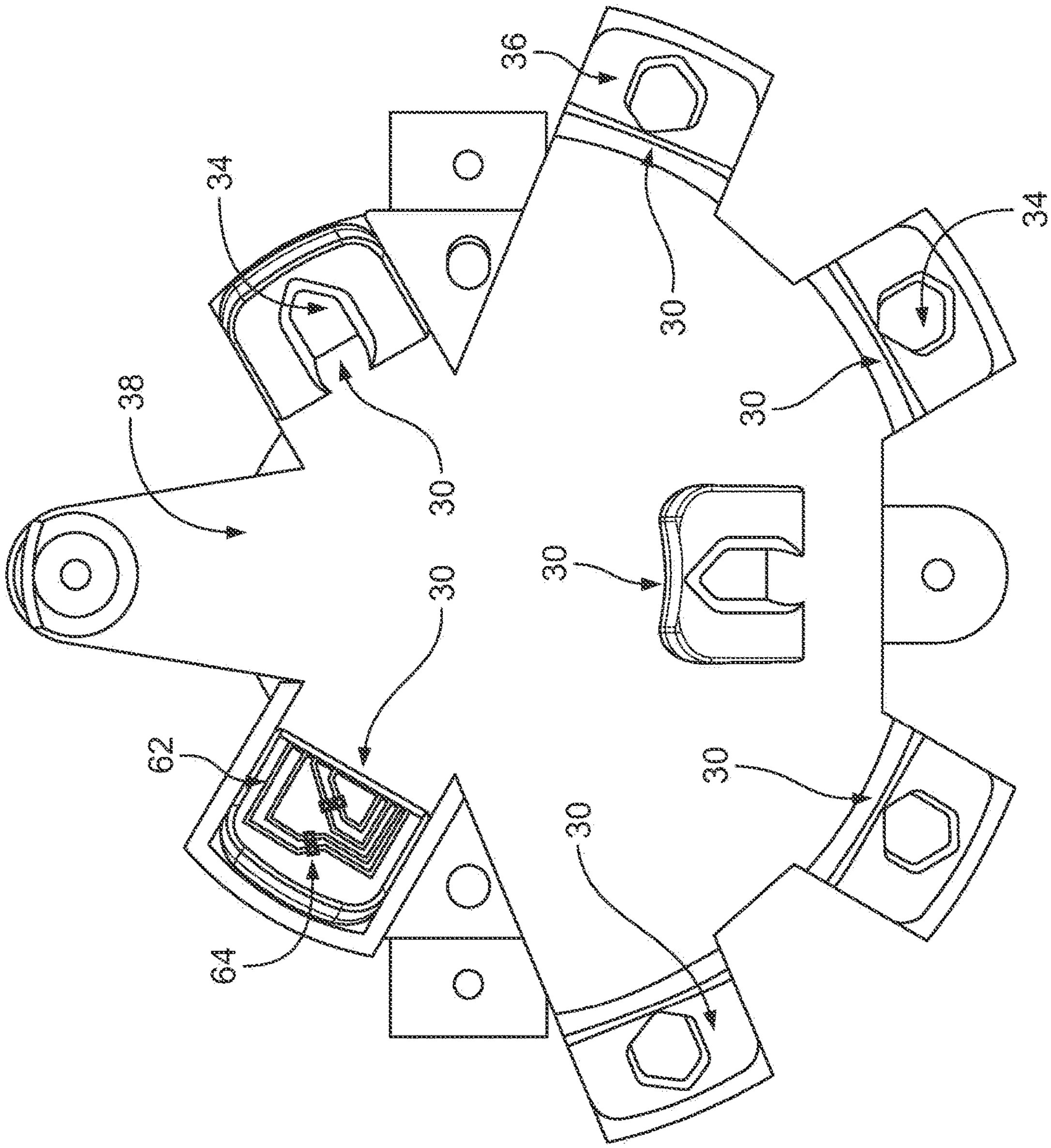
FIG. 3 is a front elevational view of a carrier frame of the underwater light of FIG. 1A with some parts rendered transparently.

Referring next to the lamp 24, the lamp 24 includes a plurality of lighting elements 30, each having a window 34. Each of the lighting elements 30 preferably includes at least one light emitting diode ("LED"). In some instances, the lighting elements 30 are spatially arranged such that none of the windows 34 are coplanar. Further, as shown in FIGS. 1-3, none of the windows 34 are positioned on a plane that is parallel to the plane on which any of the other windows 34 are positioned. The positioning of the lighting elements provides an array of directional lighting sources that, when energized, provide a highly uniform distribution of lighting intensity and chromaticity across at least partially underwater illuminated pool and spa surfaces. Although the underwater light 10 of FIGS. 1-3 shows seven lighting elements 30 in a specific arrangement, other quantities and arrangements of the lighting elements 30 are contemplated, including those discussed hereinbelow, to provide wider or narrower distributions of light if desirable. For example, some embodiments include three non-coplanar, non-parallel lighting elements and some embodiments include eight or more lighting elements.

In some embodiments, each of the lighting elements 30 includes a circuit having at least one LED. For protection and optimal light transmission, each lighting element 30 can be arranged within a LED carrier 36 formed in a generally cuboid shape, as shown in FIGS. 1-3. The LED carriers 36 can be coupled to a carrier frame 38, which holds each of the lighting elements 30 in the desired relative spatial position with respect to the other lighting elements 30. The LED carriers 36 can be made of a thermoplastic material and may be optically clear, translucent, transparent, or some other opacity to further optimize visible light transmission. In some embodiments, the LED carriers 36 can employ a selectively semi-opaque material or coating to provide partial diffusion of the lighting source. Further, although shown as a cuboid in FIGS. 1-3, the LED carriers 36 can be formed as any number of polygonal three-dimensional shapes or as ovoids.

The LED carriers 36 are exposed to the underwater environment and are designed to protect the internal circuitry of the underwater light 10 from water exposure. Accordingly, the circuit of the lighting element 30 can be mechanically coupled to the respective LED carrier 36 in a variety of ways to create a substantially waterproof barrier between the lighting element 30 and the wet environment. In some forms, printed circuit boards are fully encapsulated within the respective LED carrier 36 by a single or multiple-layer material, such as, for example, thermoplastic, and are affixed directly to the internal side of the window 34 of the respective LED carrier 36. The LED carriers 36, thus, provide mechanical, thermal, and electrical protection of the lighting elements 30 while simultaneously enabling transmission of light with varying wavelength and chromaticity. In other forms, printed circuit boards are affixed to a portion of the tube assembly 14. The tube assembly 14 can provide mechanical, thermal, and electrical protection for the lighting elements 30.

The lighting elements 30 can be configured to produce a variety of light intensities, colors, sequences, and patterns. For example, the underwater light 10 can produce light consisting of one of five different fixed colors. In some forms, the underwater light 10 can produce one of seven pre-programmed color shows by selectively energizing one or multiple LEDs at a specified time with a specified drive current. The lighting elements 30 can be grouped into channels designated for a specific color such as red, green, blue, and white. In some forms, when configured as a white-only unit, the device can produce light consisting of one chromaticity and three different intensity levels. In some embodiments, the white-only unit can produce monochromatic “cool white” light (e.g., generally known as about 6500K color temperature). In some embodiments, the white-only unit may employ LEDs producing monochromatic “warm white” light (e.g., generally known as about 2700K color temperature). In some embodiments, the underwater light 10 can employ LEDs producing monochromatic orange light (e.g., about 560 nm wavelength or greater) suitable for some applications.

Figure 11:
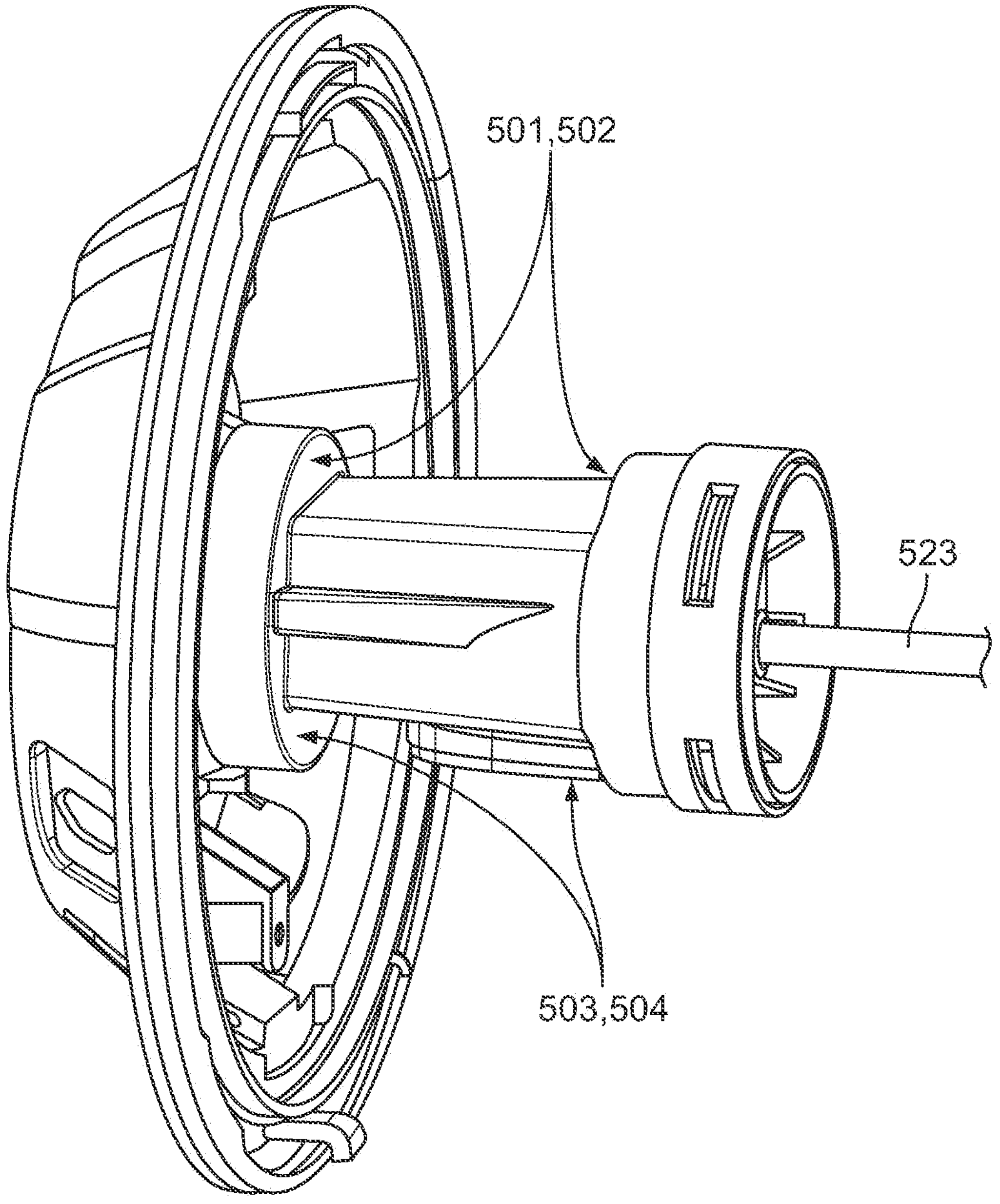
FIG. 11 is a rear isometric view of an underwater light according to one embodiment.

Referring next to the tube assembly 14 of the underwater light 10, the tube assembly 14 (see FIG. 2) includes a tube housing 40, an end cap 42, and a single printed circuit board assembly (PCBA) 44. The PCBA 44 can include at least one LED driver and an embedded microcontroller. The microcontroller can include a processor and memory, which can be used to store, for example, pre-programmed color shows as discussed previously, or other performance algorithms. The PCBA 44 is electrically coupled to the lighting elements 30 of the lamp assembly 12, and the PCBA 44 is designed to be positioned within the tube housing 40, which is provided in the form of a substantially cylindrical tube 45 defining an interior portion 46. The PCBA 44 is also electrically coupled to a power source via wiring that extends through a bore 48 in the end cap 42. In some forms, the tube housing 40 has four substantially perpendicular faces 501-504 (see FIG. 11) that could be used to contain the power cord 523 when it is installed by an industry professional to wrap the cord 523 around the body to provide excessive length to allow the light to be maintained out of the water without draining the pool.

Overheating during use can be a concern for lighting systems in general. Here, heat generated by the PCBA 44 is dissipated to the surrounding environment by various transfer mechanisms including one or more of convection, conduction, and radiation. In some instances, heat dissipation can be improved by employing a thermally conductive filler within the tube assembly 14 that encompasses the PCBA 44. Some embodiments further contemplate the use of a heat sink. The PCBA 44 can also include a two-terminal solid state thermally sensitive transducer, e.g. a thermistor, which can be used to detect temperature changes within the circuit. The integration of a thermistor may help address concerns of overheating during use. In some embodiments, the tube housing 40 is formed with specific geometry, such as the inclusion of cooling fins to improve heat transfer from the housing to the environment. Likewise, conduction through the housing to the environment may be improved by employing a polymeric housing material boasting higher thermal conductivity.

Figure 12:
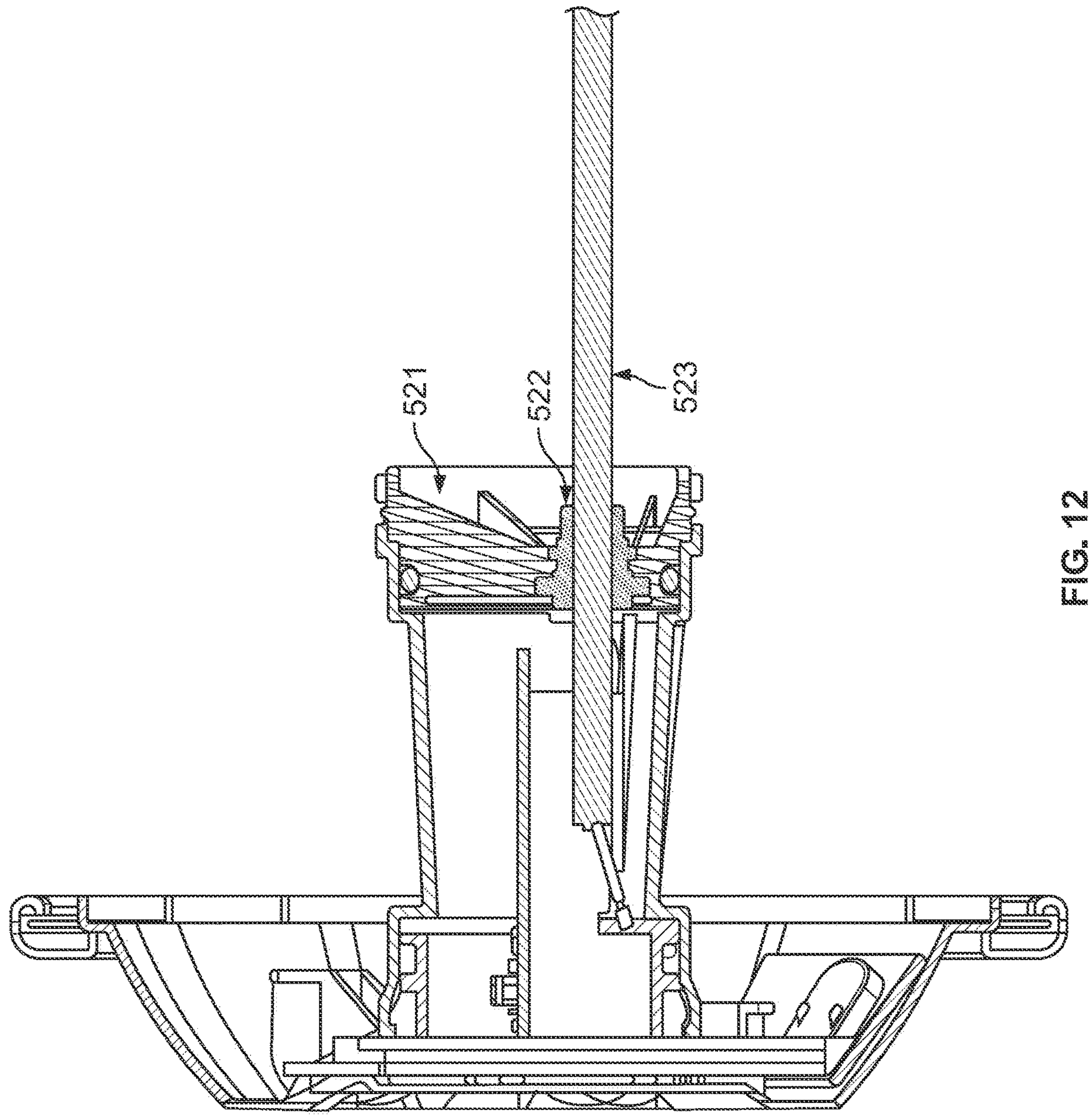
FIG. 12 is a cross-sectional side view of an underwater light according to one embodiment.

The tube housing 40 and the end cap 42 can be formed from a suitable polymeric material, such as thermoplastic, and an elastomeric material, such as rubber, to create a substantially water proof barrier between the electronics of the underwater light 10 (e.g. the lighting elements 30 and the PCBA 44) and the underwater environment. As described above with respect to the lamp assembly 12 and the tube assembly 14, the tube housing 40 and the end cap 42 can be connected by joining methods, such as, for example, ultrasonic, vibratory, hot plate, or laser welding, or by a mechanical coupling such as a one-way annular snap joint. Also, a sealing element, such as epoxy, can be used to create a fluid tight barrier in the bore 48 through which the wiring extends out of the tube assembly 14. In this way, the electronics within the underwater light 10 can be protected from the underwater environment. In some instances, a sealing grommet 522 (shown in FIG. 12) made of an elastomeric material may be used to create a substantially waterproof barrier with an outer jacket of the power cord 523. The sealing grommet 522 can be inset upon assembly so that it does not protrude past an end cap 521, which would limit the bend radius of the power cord 523, to ensure the sealing surfaces are not altered during installation.

Figure 4:
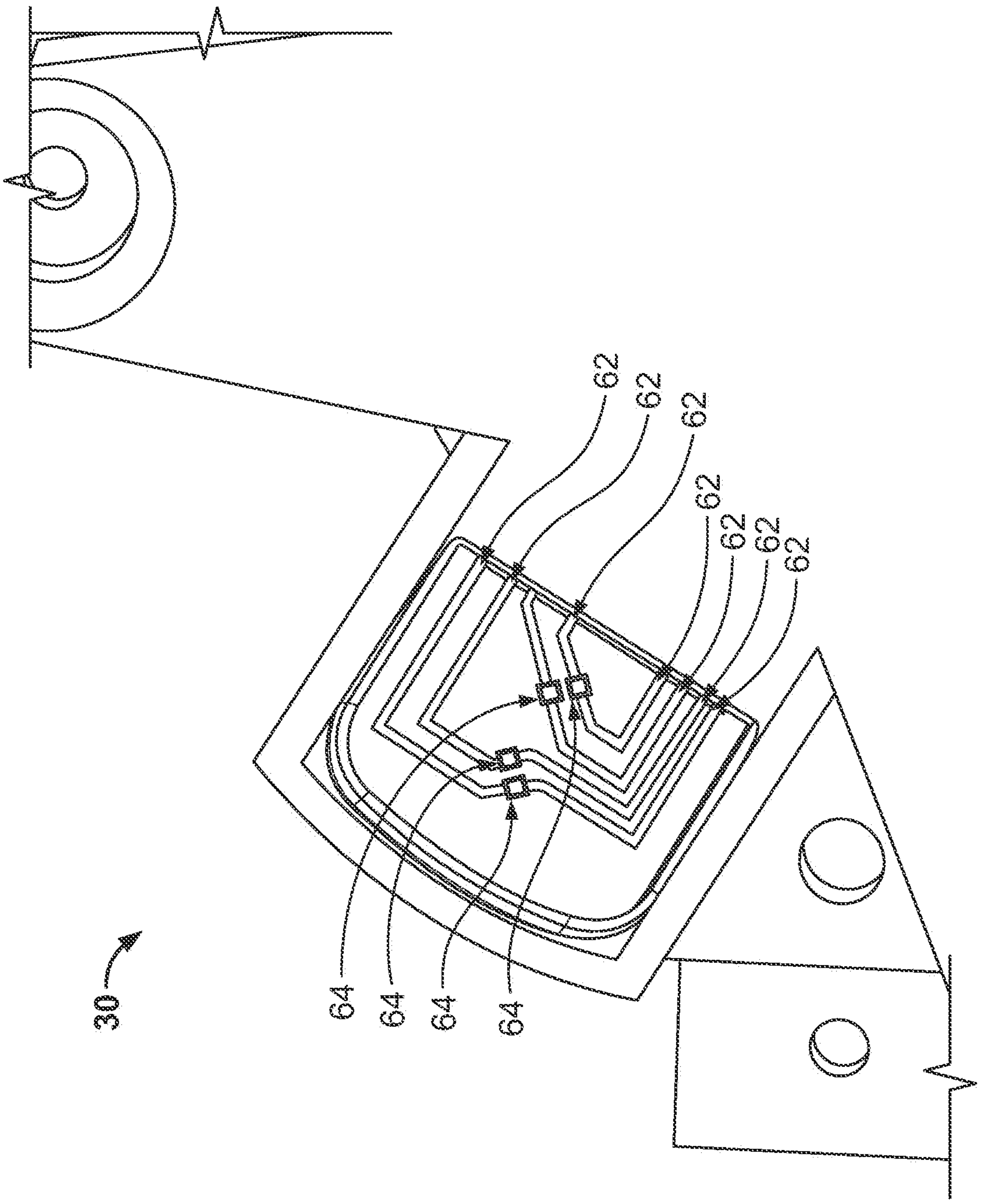
FIG. 4 is a partial view of the carrier frame of FIG. 3.
Figure 5:
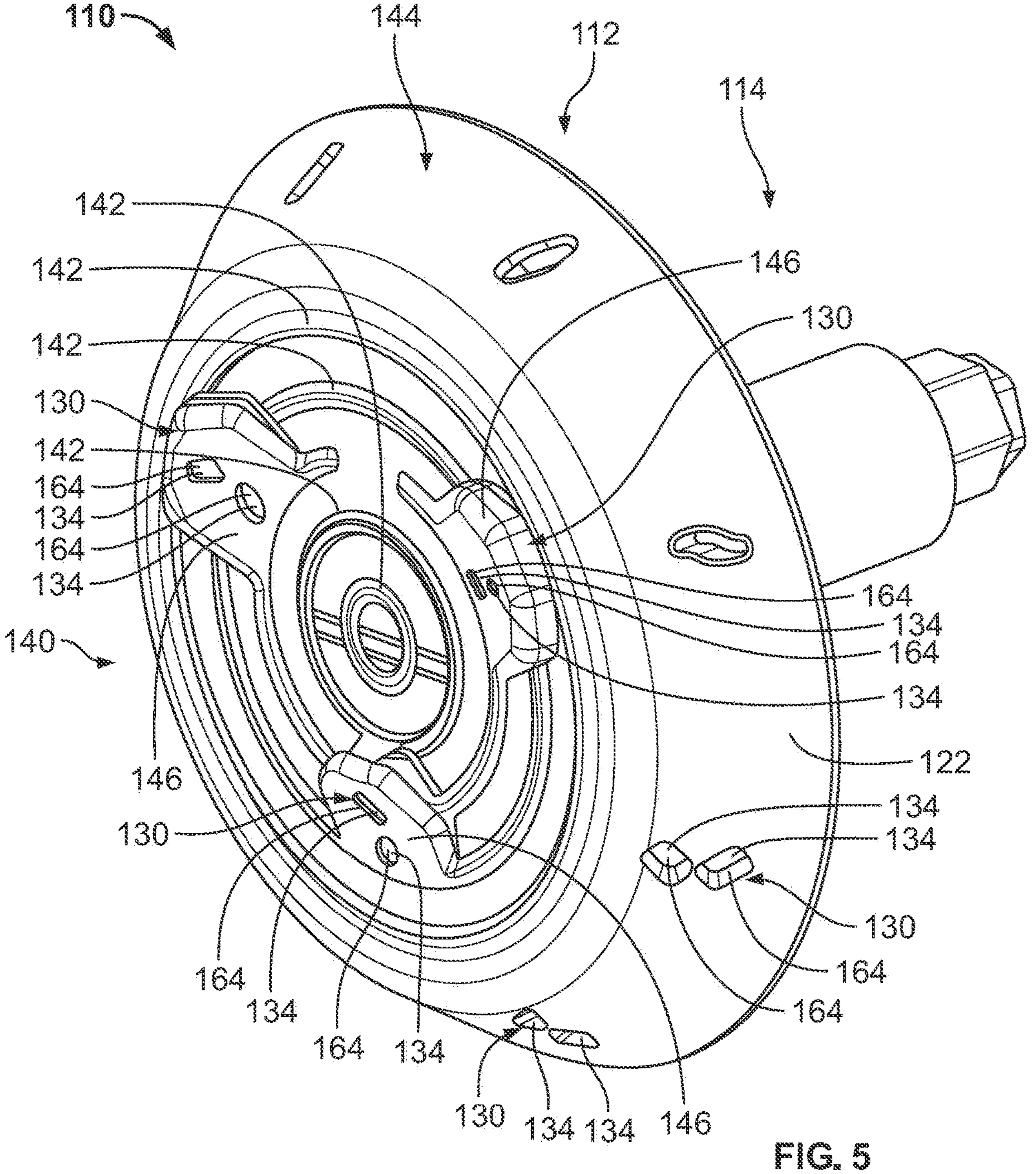
FIG. 5 is a front isometric view of an underwater light according to one embodiment.

FIGS. 3 and 4 illustrate the LED carrier frame 38 and the lighting elements 30 in greater detail. The lighting element 30 includes traces 62 produced from one or more sheets of conductive material, such as steel, copper, or aluminum, which is cut using a conventional method such as die stamping, laser cutting, or waterjet cutting. The lighting elements 30 also include a plurality of LEDs 64 (or LED chips), which are encapsulated with a thermoplastic material into permanent physical and electrical contact with the traces 62 as shown in FIG. 5. The LEDs 64 align with a window 34 of an LED carrier 36 formed through the encapsulation process. Thus, the lighting element 30 is robust, resistant to impact, and impervious to the surrounding underwater environment.

FIG. 5 illustrates an underwater light 110 according to another embodiment. The underwater light 110 can include two interconnected portions provided in the form of a lamp assembly 112 and a tube assembly 114, which can contain one or more electrical components similar to the embodiments described above, e.g. PCBA, thermistor, microcontroller. The lamp assembly 112 includes a lamp housing 122 and a plurality of lighting elements 130, each having two windows 134 that are coplanar and arranged at an angle to one another. Each of the plurality of lighting elements 130 includes a pair of LEDs 164, which correspond to the two windows 134 of each lighting element 130. In some embodiments, none of the lighting elements 130 have windows 134 that are coplanar with the windows 134 of another lighting element 130. Also, none of the lighting elements 130 have windows 134 that are positioned on a plane that is parallel to the plane on which the windows 134 of another lighting element 130 are aligned.

When connected, the lamp housing 122 and tube assembly 114 form a mushroom shape, with the tube assembly 114 forming the mushroom stem and the lamp housing 122 forming the mushroom head. A top surface 140 of the lamp housing 122 includes a plurality of raised, concentric ridges 142, and a plurality of the windows 134 are positioned on the top surface 140, radially outward from the center of the top surface 140. A plurality of windows 134 are also positioned on the downward sloping outside face defined by a housing skirt 144. Further, a plurality of the pairs of windows 134 can be formed onto a raised surface 146, such that the raised surface 146 is tilted at an angle from the plane of the top 140 of the lamp housing 122 to protrude outwardly from the top surface 140. Some of the raised surfaces 146 can be tilted toward the center of the top surface 140, and some can be tilted away from the center of the top surface 140. The positioning of the lighting elements 130 provides an array of directional lighting sources that when energized, provide a highly uniform distribution of lighting intensity and chromaticity across illuminated pool and spa surfaces.

Figure 6:
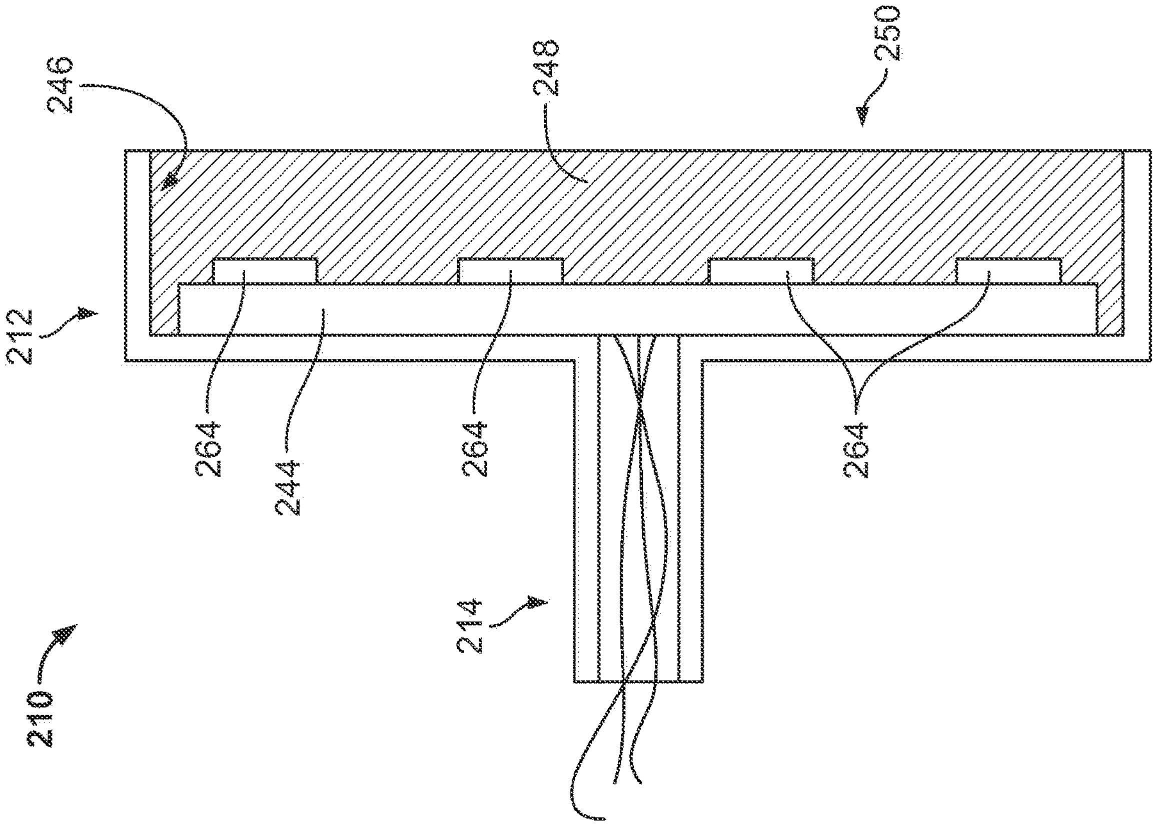
FIG. 6 is a cross-sectional side view of an underwater light according to another embodiment.

FIG. 6 illustrates a portion of an underwater light 210 according to another embodiment. The underwater light 210 includes a lamp assembly 212 and tube assembly 214. The lamp assembly 212 includes a cavity 246 containing a printed circuit board ("PCB") 244 that is encapsulated in a clear, transparent, or translucent potting compound 248. The PCB 244 includes a plurality of LEDs 264, which direct light out from a mouth 250 of the cavity 246. The PCB 244 is electrically coupled to a power source or a PCBA having a microcontroller with a processor and memory. The microcontroller can store pre-programmed color shows as mentioned above with respect to other embodiments.

Figure 7:
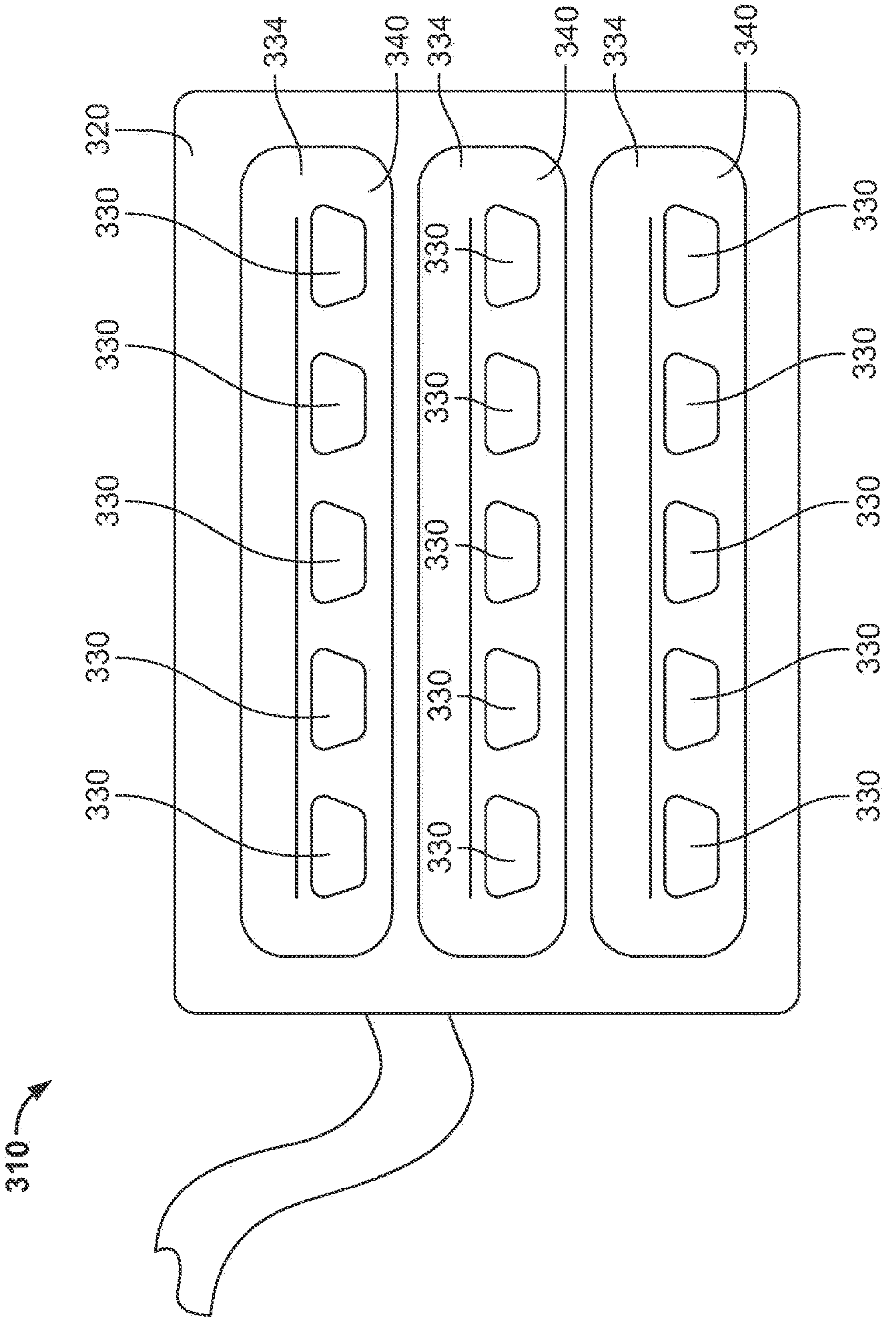
FIG. 7 is a front elevational view of an underwater light according to a further embodiment.
Figure 8:
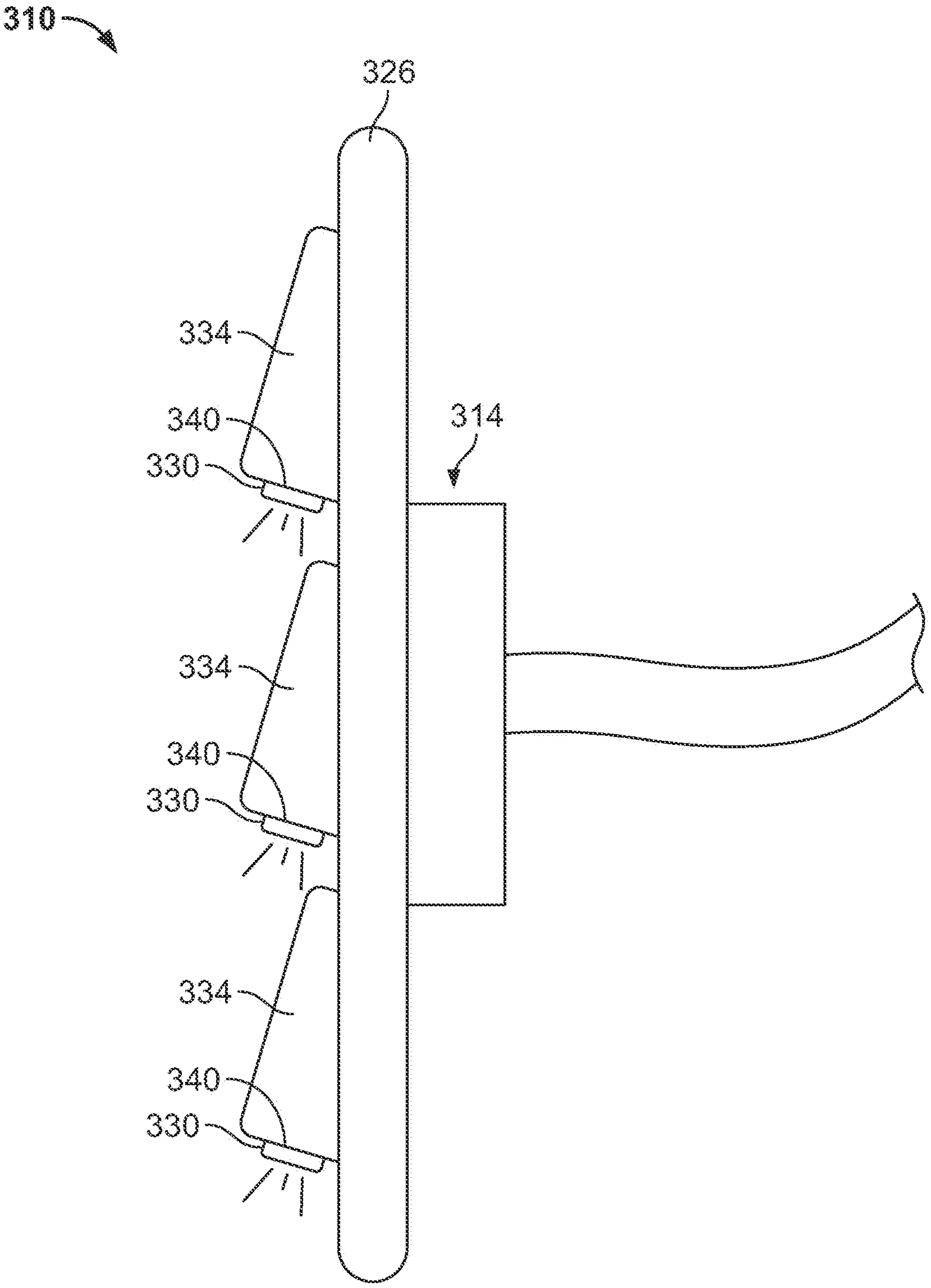
FIG. 8 is a side elevational view of the underwater light of FIG. 7.

FIGS. 7 and 8 illustrate an underwater light 310 according to a further embodiment. The underwater light 310 includes a tube assembly 314 and a face plate 326 having multiple transparent, elongate windows 334. Each window 334 defines an interior space that contains a plurality of lighting elements 330. The face plate 326 can have a substantially rectangular shape, and the windows 334 are arranged in parallel rows. The windows 334 can extend outwardly from the face plate 326 to form a triangular side profile, as shown in FIG. 8. The lighting elements 330 are positioned inside of the windows 334 such that the light from the lighting elements 330 is directed downward, from a lower edge 340 of the triangular side profile of the windows 334. It should be noted that, based on the installation position of the face plate 326, the light can also be directed at a variety of angles as the face plate 326 is rotated about the longitudinal axis of the tube assembly 314 during installation (e.g. right, left, upward, or any other direction about the longitudinal axis).

Each lighting element 330 is either formed integrally with (via thermoplastic encapsulation), or pressed against, or adjacent to, the interior wall of the windows 334. In some instances, the lighting element 330 is positioned directly adjacent (e.g., in direct contact with) the interior wall of the windows 334. The positioning minimizes the travel of light from the lighting elements 330 through the air before traveling to the water. In other instances, the lighting element 330 is not positioned directly adjacent to the interior wall of the windows 334 and there is a substantial air gap that provides enough space to utilize lensing to enhance the performance of the lighting element 330. The windows 334 are configured on the face plate 326 such that none of the lighting elements 330 of one window 334 are coplanar with the lighting elements 330 of another window 334.

Figure 9B:
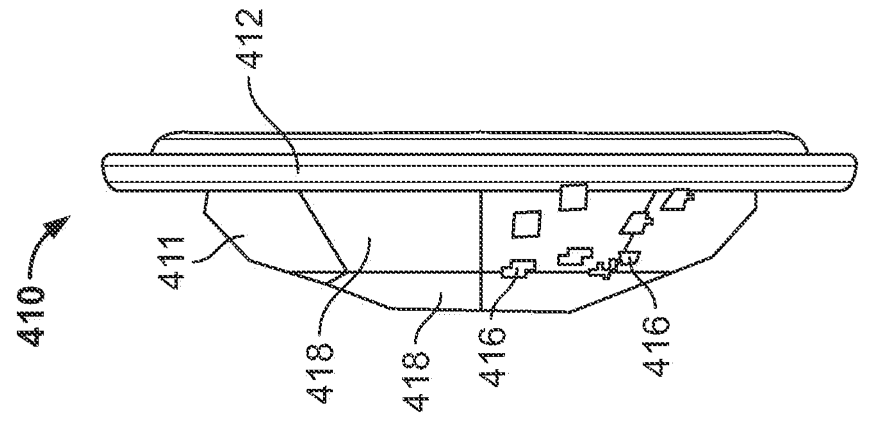
FIG. 9B is a side elevational view of the underwater light of FIG. 9A.
Figure 9A:
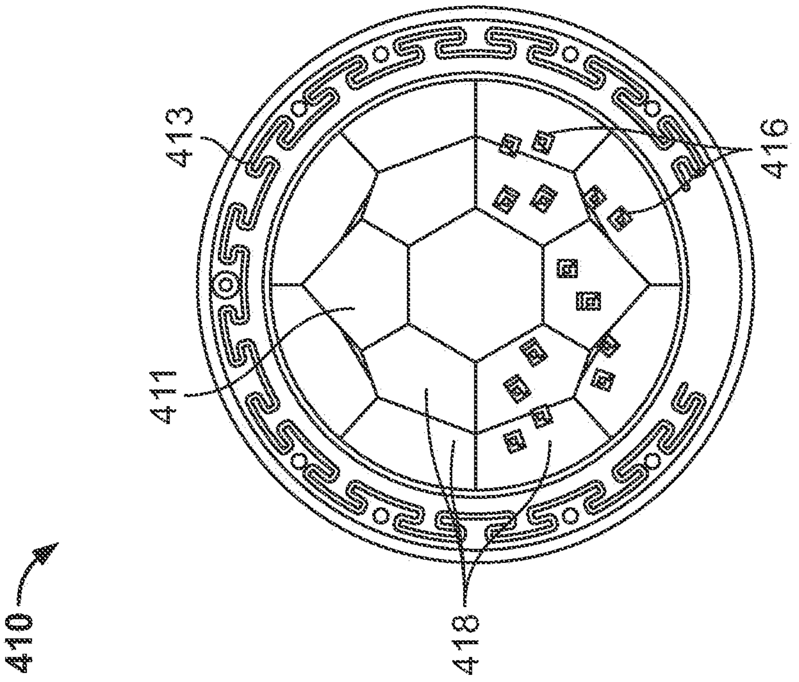
FIG. 9A is a front elevational view of an underwater light according to a further embodiment.
Figure 10:
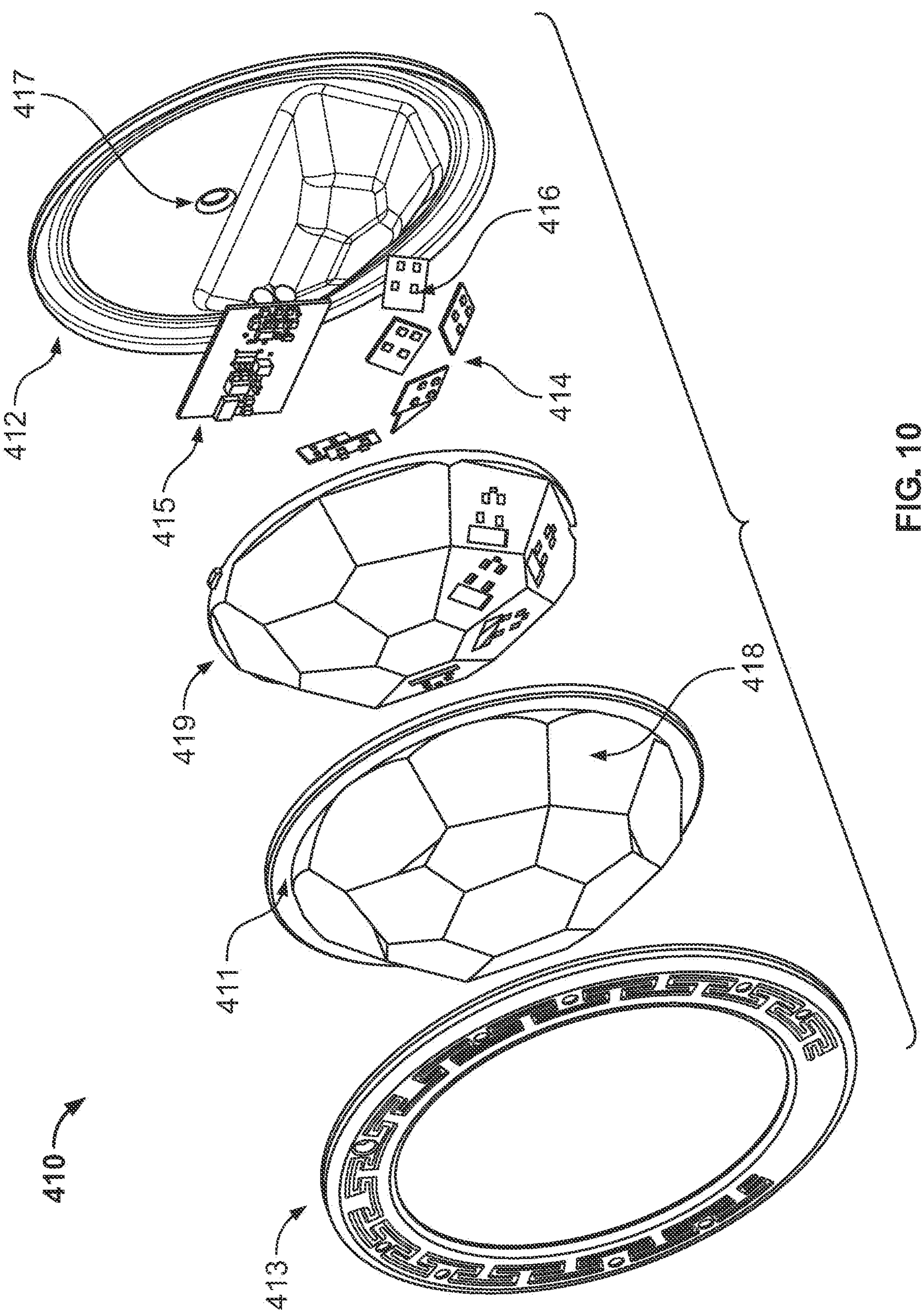
FIG. 10 is an exploded isometric view of the underwater light of FIG. 9A.

FIGS. 9A, 9B, and 10 illustrate an underwater light 410 according to another embodiment. The underwater light 410 operates within a single hermetically-sealed housing. In some forms, the housing is provided in the form of a front housing 411 and rear housing 412. Establishing a water-tight connection between the housings may be completed by compression of an elastomeric seal using a circumferential clamping mechanism affixed to an integrating disk 413. In this embodiment, the front housing 411 of the lamp may be produced from a material so as to permit visible light transmission. The material may be provided as a borosilicate glass or a polymeric type, for example, that selectively provides mechanical, environmental, and electrical protection. The rear housing 412 may be produced from a highly-corrosion resistant metal, such as stainless steel. In some forms, the rear housing 412 may be produced from a selective polymeric material boasting elevated thermal conductivity. The rear housing 412 provides a thermal pathway for heat generated by both LED lighting circuits 414 and LED driver circuits 415 to be dissipated to the environment via one or more of direct conduction, convection, and radiation.

As with the lamp and tube construction, heat dissipation in the single housing may further utilize heat sinks, thermally conductive fillers, or the like. Additionally, the rear housing 412 includes a bore 417 through which the electrical wiring extends out of the rear housing 412. Similar to other embodiments, a sealing element, such as epoxy, can be used to further create a fluid tight barrier. The front housing 411 may be multi-faceted so as to provide a plurality of substantially planar sections 418, or "windows", which correspond to individual arrays of one or more LEDs 416 oriented to provide multi-directional lighting. The windows can utilize lensing techniques and may employ selective levels of opacity to provide light diffusion, similar to methods described for the underwater lights 10, 110. In some forms, the underwater light 410 includes an intermediate shell 419 that is designed to act as a visual barrier to conceal the PCBAs of the LED circuits 414 and the LED driver circuits 415 and improve visual appeal. The shell 419 may be produced from a polymeric or metallic material with selective reflective properties and of a type and color to minimize stray lighting effects due to internal reflection off of rear housing 412 and the PCBAs of the lighting and driver circuits 414, 415. Additionally, the shell 419 may also further camouflage the underwater light 410 and improve visual integration into the overall pool construction.

FIGS. 13-23 illustrate an underwater light 610 according to yet another embodiment. More particularly, the underwater light 610 comprises a face ring 620, a diffuser or lens 630, a sealing gasket 640, one or more refractor or reflector assemblies 650, one or more circuit boards with LEDs 660, a thermal pad 670, and a back housing 680. In this embodiment, the underwater light 610 operates within a single hermetically-sealed housing. In some forms, the housing is comprised of the face ring 620, the lens 630, the sealing gasket 640, and the back housing 680.

Figure 13:
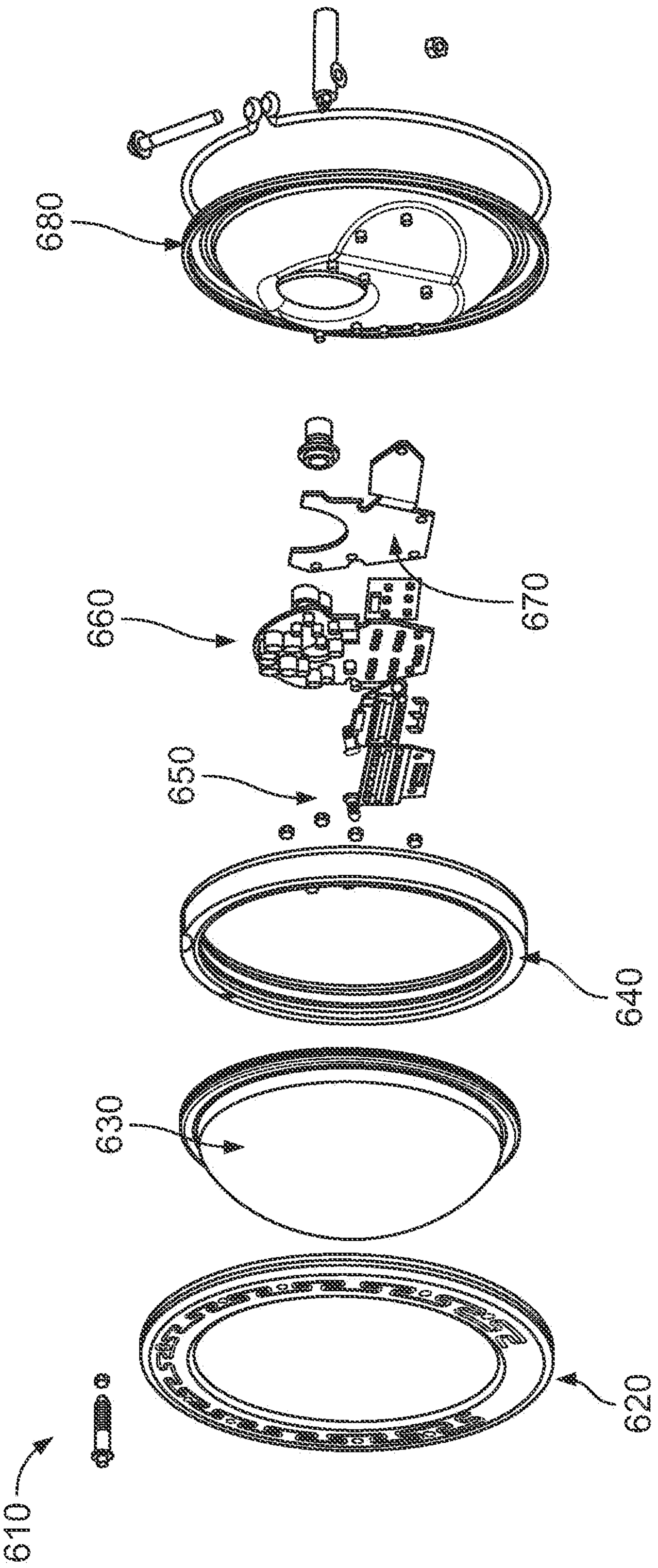
FIG. 13 is an exploded isometric view of an underwater light according to a further embodiment.

Referring to FIG. 13, the lens 630 is provided in the form of a substantially dome shaped structure. The lens 630 can be made of a thermoplastic material and may be optically clear, translucent, transparent, or some other opacity to further optimize visible light transmission. The lens 630 can also be provided as a borosilicate glass or a polymeric type, for example, that selectively provides mechanical, environmental, and electrical protection. In some embodiments, the lens 630 can employ a selectively semi-opaque material or coating to provide partial diffusion of the lighting source.

The thermal pad 670 can be produced from a selective polymeric material boasting elevated thermal conductivity. Functionally, the thermal pad 670 can act as a heat sink or a thermal filler within the housing. The back housing 680 can be produced from a highly-corrosion resistant metal, such as stainless steel. The thermal pad 670 and the back housing 680 together provide a thermal pathway for heat generated by the circuit board with LEDs 660 to be dissipated to the environment via one or more of direct conduction, convection, and radiation.

One or more circuit boards having LEDs 660 can be provided as lighting elements for the underwater light 610. The circuit boards with LEDs 660 can be provided in the form of a conductive material, such as steel, copper, or aluminum. Moreover, one or more refractor assemblies 650 can be fitted over the circuit boards 660 to provide optical manipulations to the lights emitted from the circuit boards 660. It is to be appreciated that the LEDs 660 can be integrated with the circuit boards, or the LEDs 660 can be electrically coupled to the circuit boards without being integrated thereto.

Figure 14A:
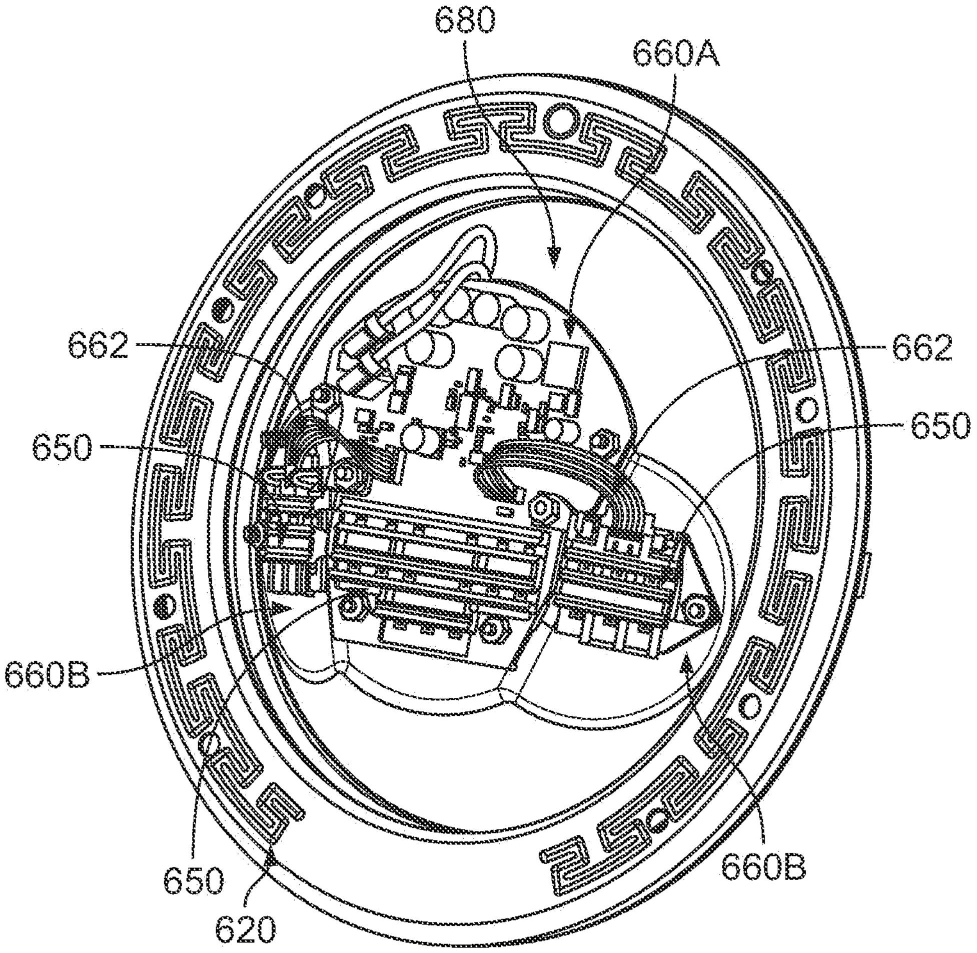
FIG. 14A is a front isometric view of a portion of the underwater light of FIG. 13.
Figure 14B:
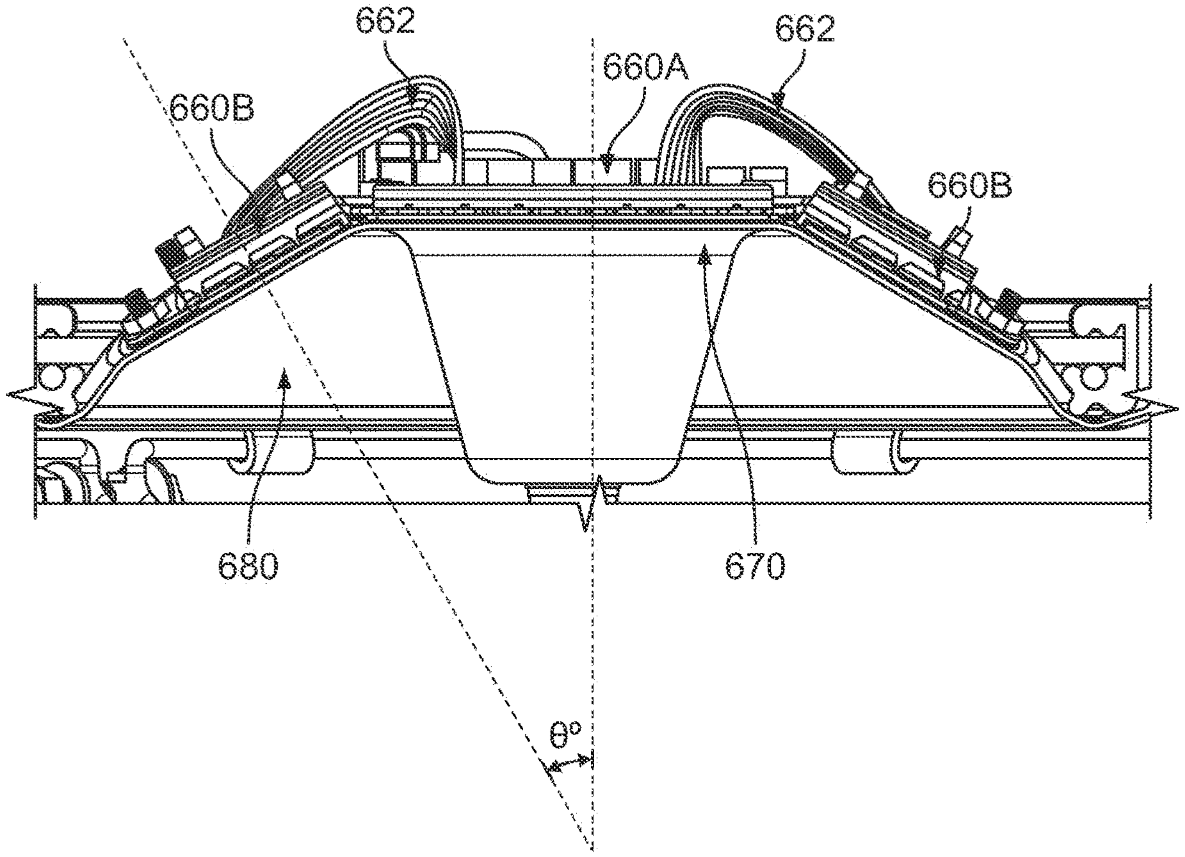
FIG. 14B is a bottom view of the underwater light of FIG. 13.
Figure 15:
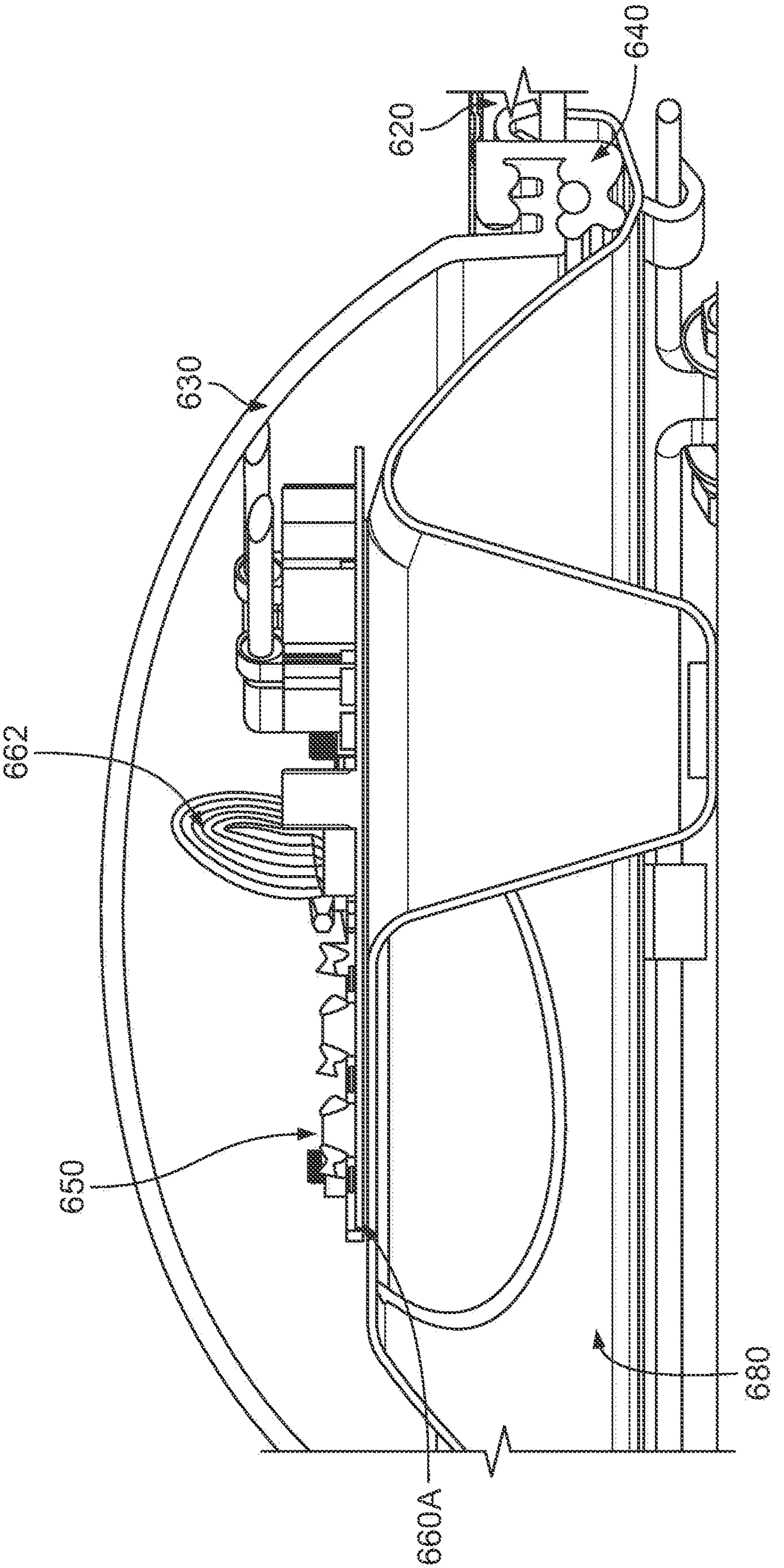
FIG. 15 is a partial cross-sectional side view of the underwater light of FIG. 13.

The underwater light 610 is shown in more detail in FIGS. 14A, 14B, and 15. In an embodiment, the underwater light 610 can comprise a plurality of circuit boards with LEDs 660, each serving as a lighting element. In such embodiment, the plurality of circuit board 660 can each face a different direction, ensuring the emission of light at different angles. In the exemplary embodiment shown in FIGS. 14A and 14B, three circuit boards with LEDs 660—a main circuit board 660A and two secondary, or side circuit boards 660B—are provided, with each one being positioned at a different angle. In an exemplary embodiment as shown in FIG. 14B, each of the side circuit boards 660B can be directed at a 0 degree angle away (such as 30 degrees) from the main circuit board 660A, as measured from an axis defining a center portion of the main circuit board 660A.

When using more than one circuit board 660, individual circuit boards 660 can be electrically coupled to one another via wires 662. In an alternative embodiment, only one circuit board 660 is used and the single circuit board 660 can be made out of flexible materials so that the single circuit board 660 can be bent or folded to provide light at different angles. When more than one circuit board 660 is used, each individual circuit board 660 can have a corresponding refractor assembly 650 fitted over it as shown in FIGS. 14A and 15.

Figure 16:
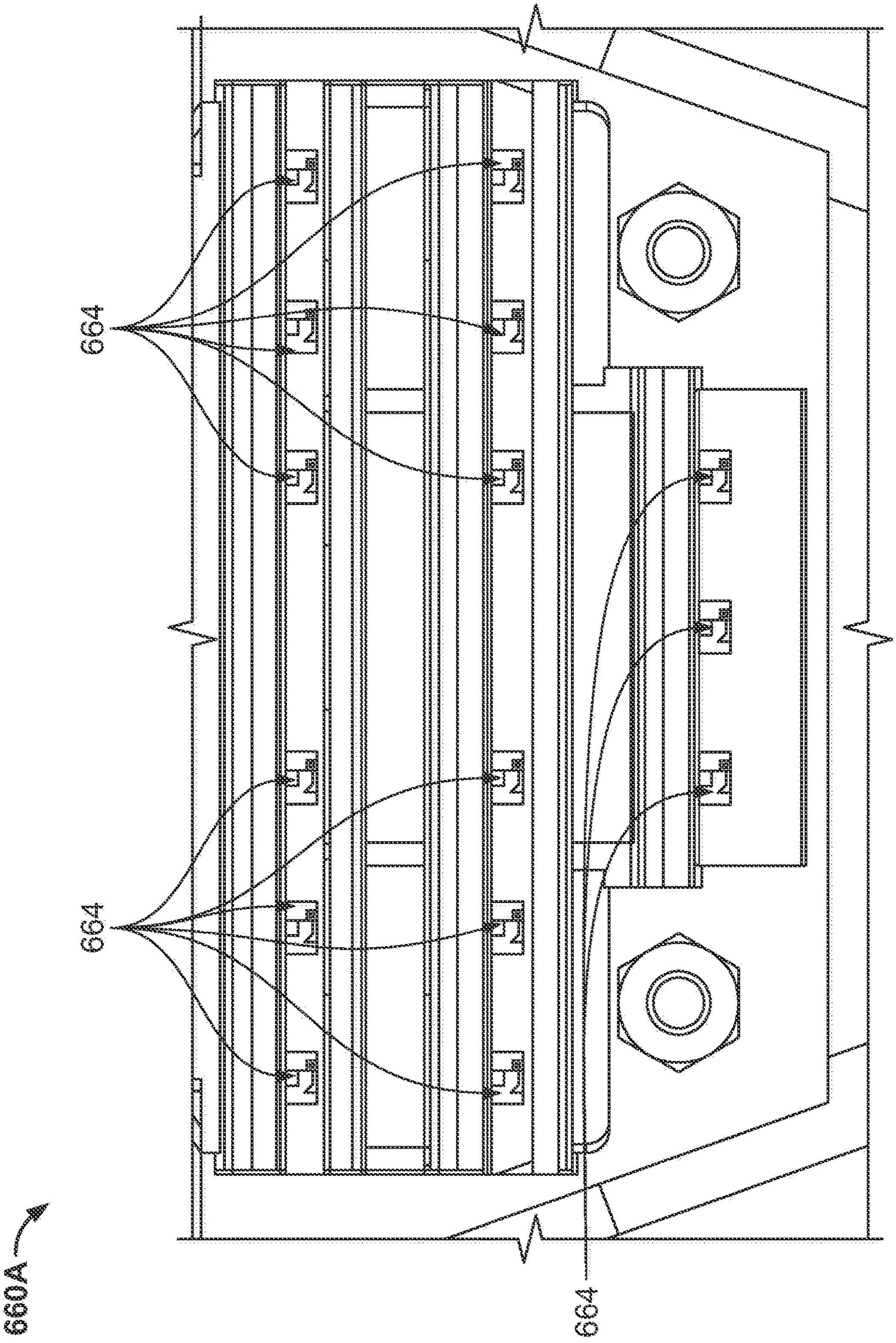
FIG. 16 is a partial front elevational view of a main circuit board of the underwater light of FIG. 13.

Referring to FIG. 16, the main circuit board 660A is shown in more detail. Under some circumstances, it may be desirable to be able to control a red-green-blue (RGB) ratio generated by a light source. Thus, in an exemplary embodiment as shown in FIG. 16, the LEDs 664 can be divided into three rows where each LED 664 is a colored LED. In one specific example, the top row of LEDs 664, from left to right, can be: red, green, red, red, green, red. The middle row of LEDs 664 can be: blue, red, green, blue, red, blue. The bottom row of LEDs 664 can be: blue, green, red.

In another example, six red LED's may be distributed in different positions in the top two rows, whereas three blue and three green LED's may be provided in alternative positions in the top two rows. Other arrangements of LEDs 664 can also be used depending on the desired lighting distribution. Further, the specific arrangement of the LEDs 664 can also depend on other factors such as the number of LEDs 664 and whether the LEDs 664 are driven at the same or different power levels.

Figure 17:
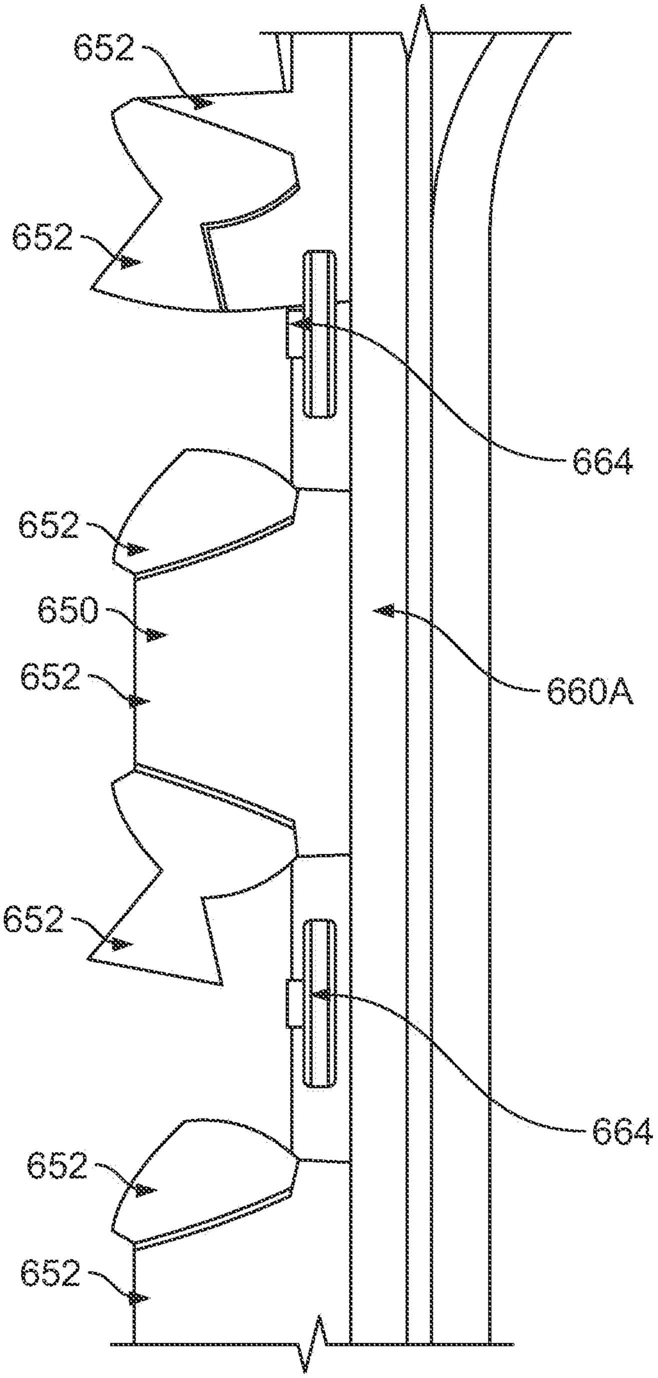
FIG. 17 is a partial side elevational view of a refractor assembly with the main circuit board of FIG. 16.
Figure 18:
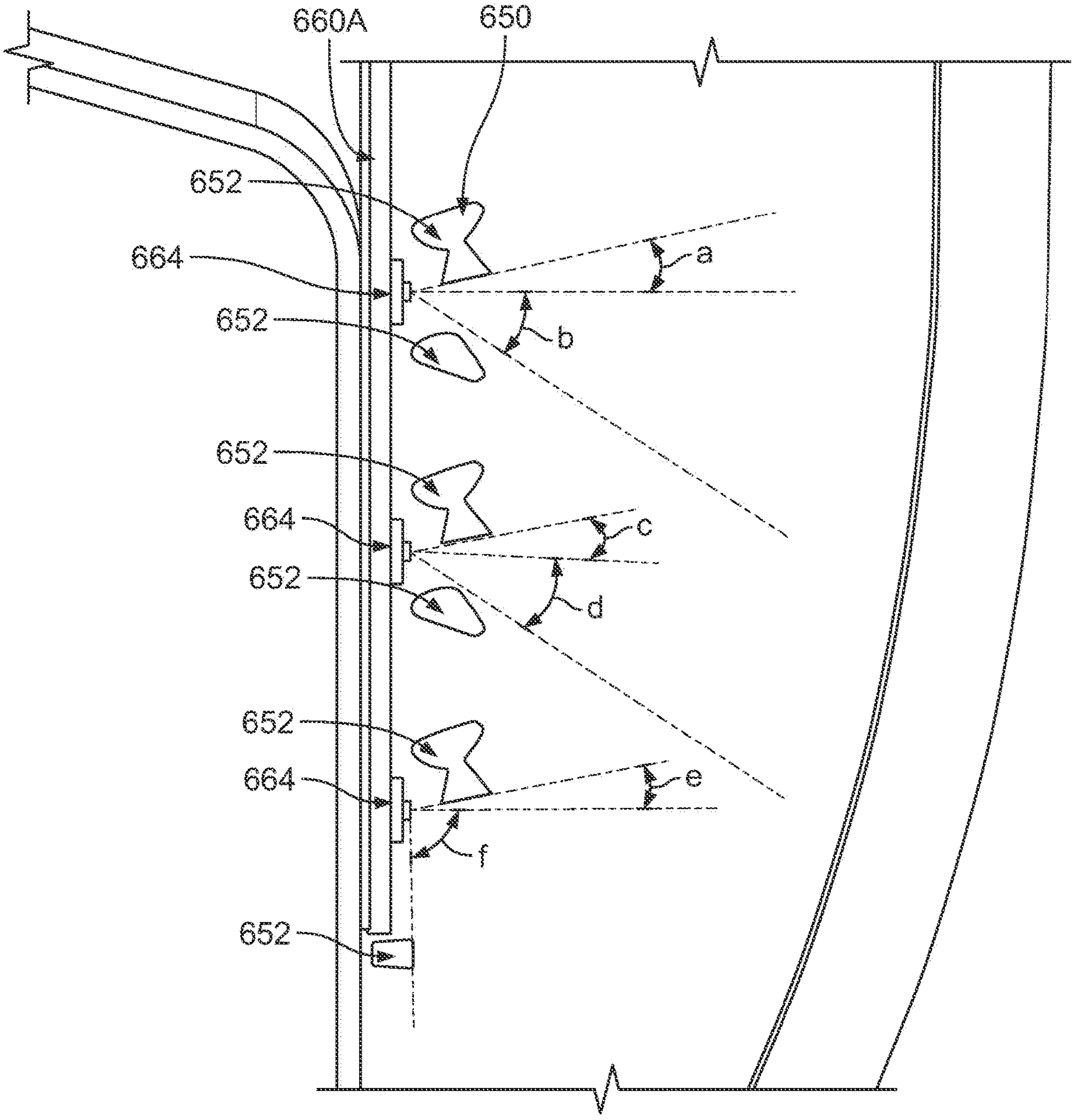
FIG. 18 is a partial side elevational view showing the relationship of the refractor assembly with the main circuit board of FIG. 16.

Referring to FIGS. 17 and 18, the refractor assembly 650 for the main circuit board 660A can comprise one or more individual refractors or reflectors 652. These refractors 652 are fitted over, and adjacent to, the LEDs 664 to provide optical manipulation to the light emitted from the LEDs 664. Referring to FIG. 18 specifically, the refractors 652 can be positioned so that each row of LEDs 664 produces cones of light at different angles. In the exemplary configuration, the top row of LEDs 664 can produce a first cone of light having a beam angle ranging from +a degree to −b degree. The middle row of LEDs 664 can produce a second cone of light having a beam angle ranging from +c degree to −d degree. And the bottom row of LEDs 664 can produce a third cone of light having a beam angle ranging from +e degree to −f degree. Put differently, the light emitted by these LEDs 664, if they are within the + and − degree for a specific row, the light can shine directly through the lens 630. However, if the light is above the + and − degree for the specific row, the light would be refracted and/or reflected to narrow the light beam before the light exit the lens 630, thus creating a more concentrated light beam from each row of LEDs 664.

In an exemplary embodiment, angles a, c, and e can be about 15 degrees, angles b, and d can be about 41 degrees, and angle f can be about 90 degrees. Using the example in connection with FIG. 16 above, the top row of LEDs 664, from left to right, can be: red, green, red, red, green, red. The middle row of LEDs 664 can be: blue, red, green, blue, red, blue. The bottom row of LEDs 664 can be: blue, green, red. Thus, when the colored LED configuration of FIG. 16 is combined with the refractor configuration of FIG. 18, the exemplary configuration results in more red light in the about +15 to about −41 degree cones than in the +15 to −90 degree cone. It is noted that each row of LEDs 664 does not have to have a same refractor angle. Indeed, refractor angles can be customized to each individual LED 664 or a collection of LEDs 664 depending on the desired lighting distribution.

In further embodiments, the angles a, c, and e can be between about 5 degrees to about 35 degrees (or between 5 degrees and 35 degrees), and angles b, and d can be between about 25 degrees and about 60 degrees (or between 25 degrees and 60 degrees). In other embodiments, the angles b, d, and f can be at least twice of angles a, c, and e. Moreover, the angles a, c, and e can be the same or substantially the same, but in some embodiments, the angles a, c, and e can differ from one another. In yet another embodiment, two of the angles a, c, and e, can be the same or substantially the same while the remaining angle is different. Likewise, the angles b, d, and f can be the same or substantially the same, but in some embodiments, the angles b, d, and f can differ from one another, or two of the angles can be the same while the remaining one differs.

In general, as light travels a distance through water, the red wavelengths decrease in intensity more than the blue or the green affecting the color temperature observed depending on the distance the light travels in water. In a pool or a spa, the floor of such floor is generally closer to where an underwater light is normally positioned than the opposite or side walls. Further, the distance from a light source to a spot on the floor or adjacent wall increases rapidly as the angle between the light source and the spot increases. Thus, uniform color in the pool or the spa can be achieved by sending different ratios of red to green and blue light depending on the angle of the light from the source, with less red light directed pointing straight down and straight to the sides and gradually increasing as the angle increases.

Figure 19:
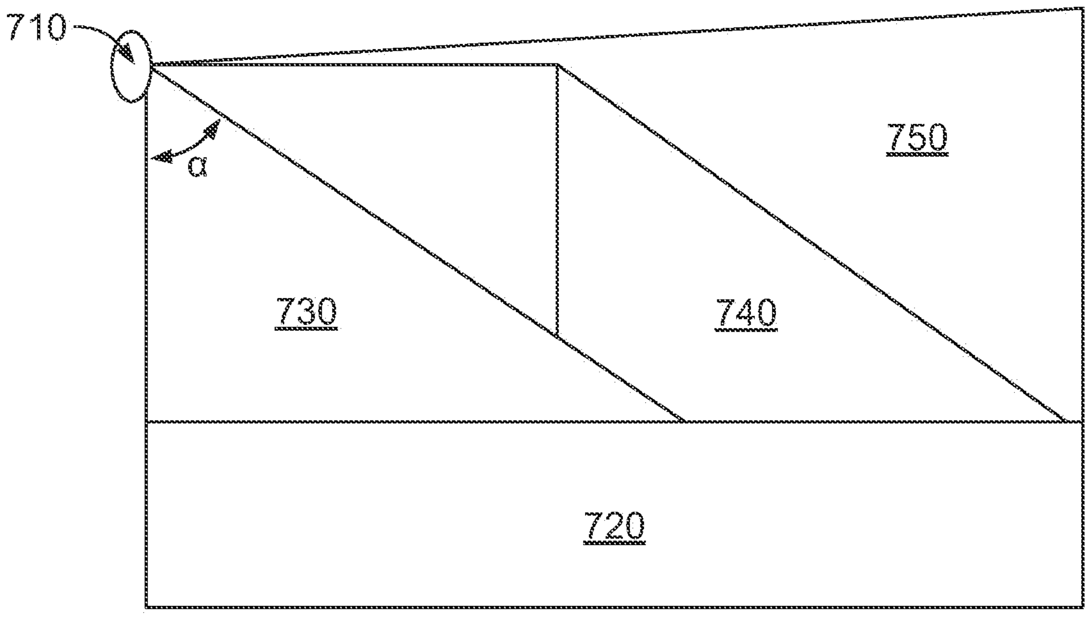
FIG. 19 is a schematic diagram illustrating several lighting regions to achieve substantially uniform light color on a pool floor.

Referring to FIG. 19, an underwater light 710 is shown in relation to a floor 720 or a bottom surface of a pool or a spa. The underwater light 710 can comprise a plurality of lighting elements that can generate lights of a different color. For example, the underwater light 710 can comprise of a plurality rows of LEDs, wherein some LEDs are red LEDs, some are green LEDs, and some are blue LEDs. To achieve a uniform color, in an embodiment, a plurality of regions can be divided so that within each region, there is a different red-green-blue (RGB) ratio generated by the light source 710. By way of example, a lighting region can be broken into a first region 730, a second region 740, and a third region 750. In an exemplary embodiment where an angle a is about 49 degrees, the RGB ratio within the first region 730 can be 1-1-1 (red to green to blue). Further, the RGB ratio within the second region 740 can be a blend from 1-1-1 to 2-1-1. Moreover, within the third region 750, the RGB ratio can be 1.5-1-1. Providing the underwater light 710 with a RGB ratio that is correlated to an area of a pool (e.g., a spot on the floor 720) results in the color generated by the underwater light 710 being more uniform.

Figure 20:
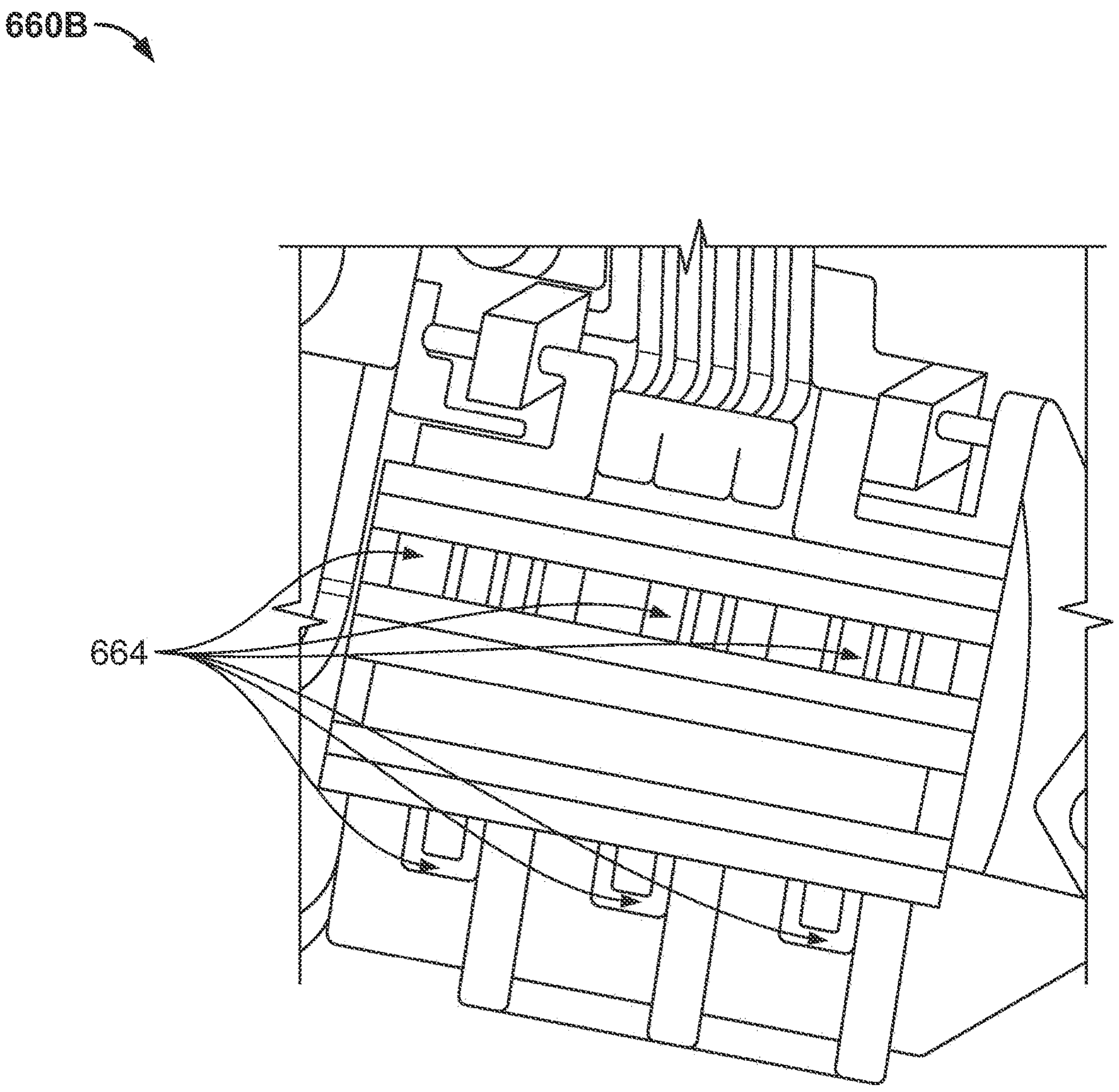
FIG. 20 is a partial front elevational view of a secondary circuit board of the underwater light of FIG. 13.
Figure 21:
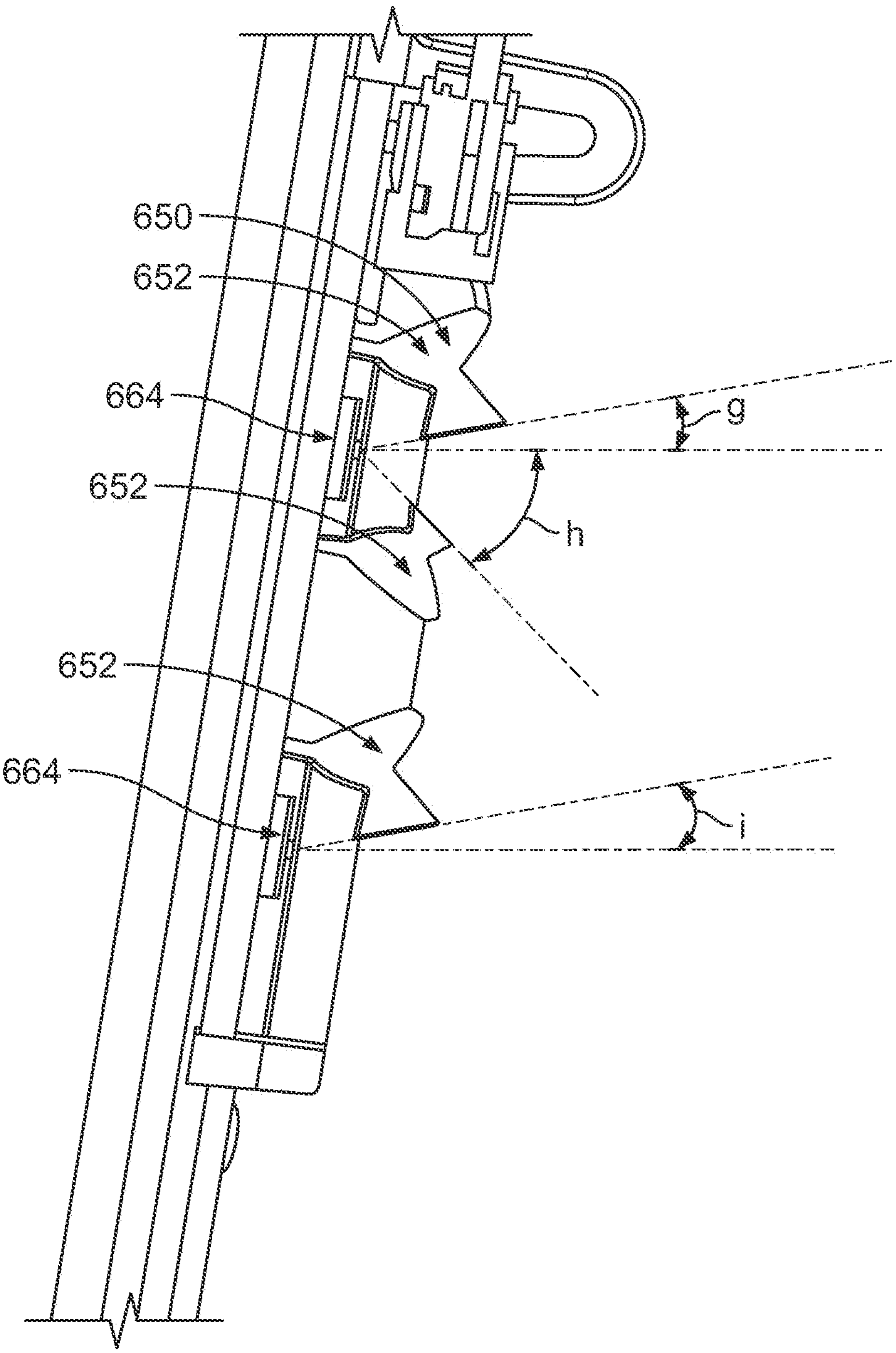
FIG. 21 is a partial side elevational view of a refractor assembly with the secondary circuit board of FIG. 20.
Figure 22:
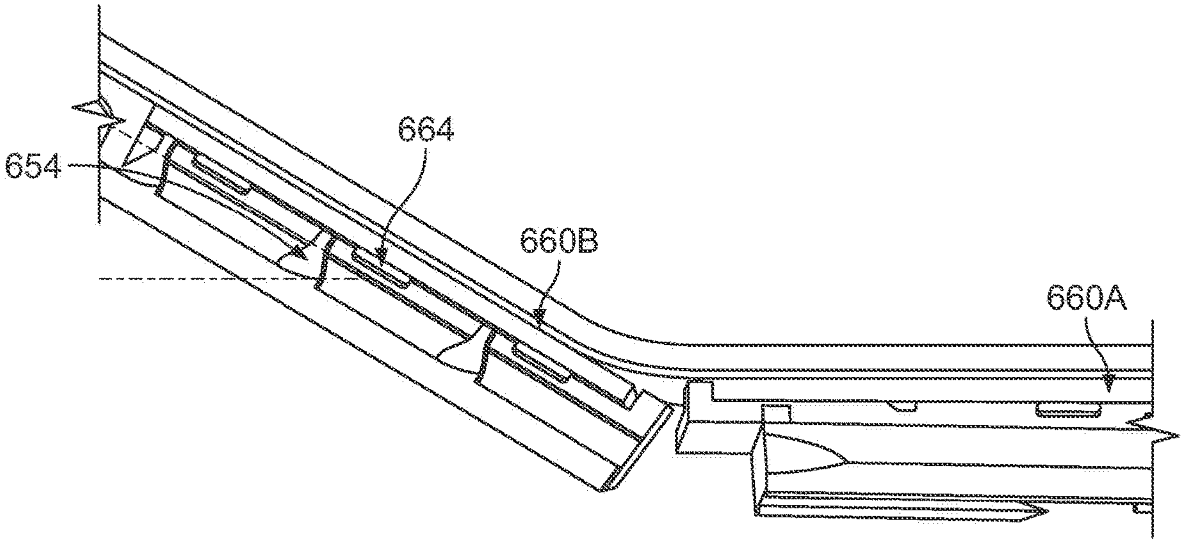
FIG. 22 is a partial top elevational view of the underwater light of FIG. 13.

Turning to FIGS. 20-22, a side, or secondary circuit board 660B is shown in more detail. Structurally, the side circuit board 660B can have a similar physical structure as the main circuit board 660A. Namely, the side circuit board 660B can have one or more rows of LEDs 664. Similarly, the LEDs 664 can be the same or different colors. In an exemplary embodiment, each side circuit board 660B can have two rows of LEDs 664. Specifically, the top row of LEDs 664 from left to right can be: red, green, red; and the bottom row of LEDs 664 from left to right can be blue, red, green. It should be noted that although the structure described for a single side circuit board 660B has been described herein, the structure is the same, or substantially similar for both of the side circuit boards 660B that are described herein.

Similar to the main circuit board 660A, a refractor assembly 650 having one or more refractors 652 can be fitted over the side circuit board 660B. Referring to FIG. 21, when viewed from a side, the refractors 652 can be used to create cones of light having beam angles ranging certain + and − angles. In the exemplary configuration, angles g and i can be about 12 degrees, and angle h can be about 50 degrees. In such an example, the cone of light generated by the top row of LEDs 664 can range from +12 degrees to −50 degrees. In other examples, the angles g and i can be between about 5 degrees to about 30 degrees (or between 5 degrees and 30 degrees), and angle h can be between about 35 degrees and about 65 degrees (or between 35 degrees and 66 degrees).

Figure 23:
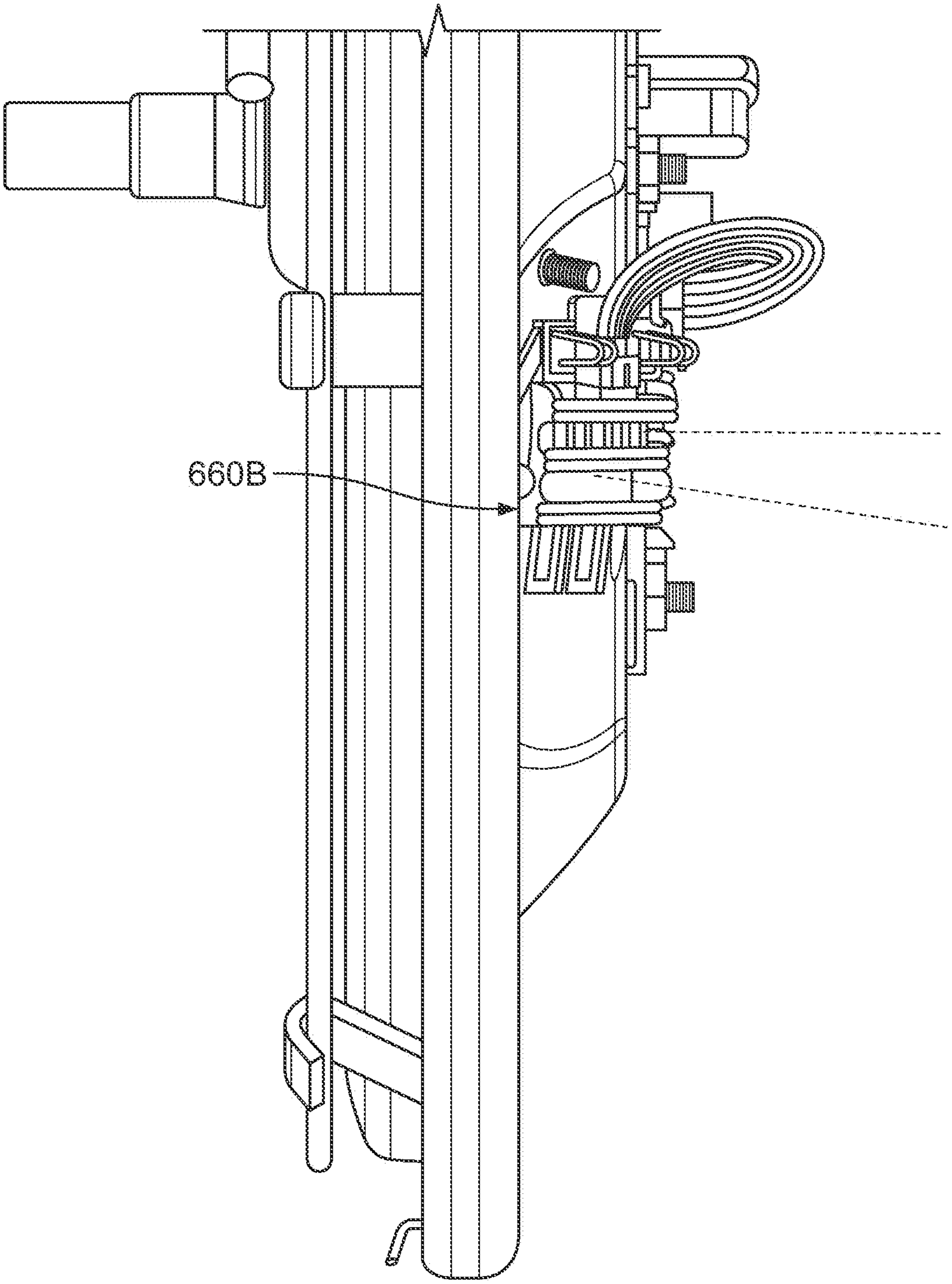
FIG. 23 is a partial side elevational view of the underwater light of FIG. 13.

An additional side reflector 654 can also be used for the side circuit boards 660B to prevent light from shining backward as shown in FIG. 22. Moreover, in an exemplary embodiment as shown in FIGS. 14B and 23, the side circuit boards 660B can each point 30 degrees away from the main circuit board 660A, and each is tilted 10 degrees toward a bottom surface such as the floor of a pool. It is noted that the dimensions and degrees provided herein are merely exemplary, and many configurations and modifications can be made using the principles and examples described herein.

Figure 24:
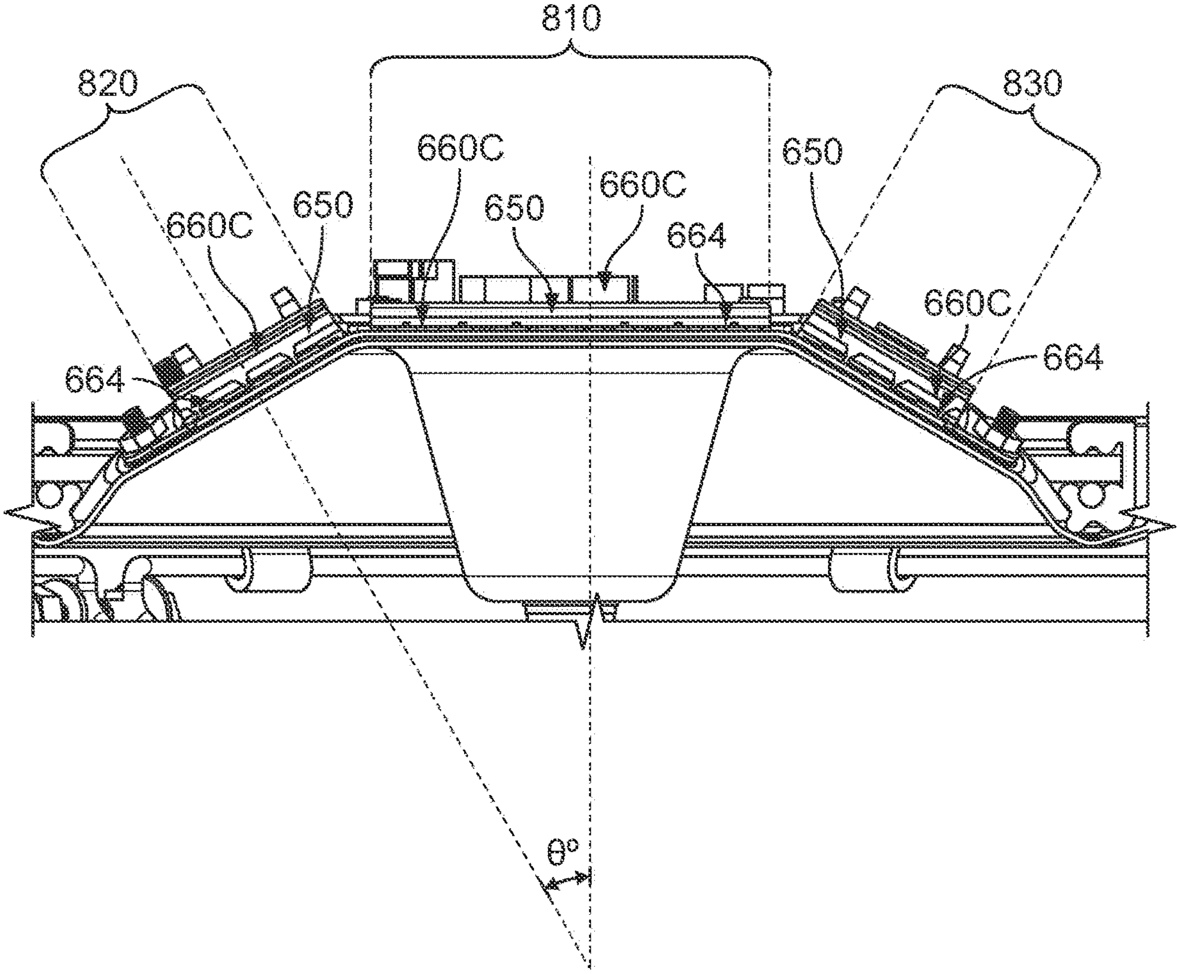
FIG. 24 is a bottom view of an underwater light according to another embodiment.

Referring to FIG. 24, an alternative embodiment is shown. In this example, only one circuit board 660C is used and the single circuit board 660C can be made out of flexible materials so that the single circuit board 660C can be bent or folded to provide light at different angles. Similar to the multi-circuit boards configurations described above, the single circuit board 660C can include a first plurality of rows of LEDs 664 within a first area 810. Moreover, the circuit board 660C can further include a second plurality of rows of LEDs 664 within a second area 820, and a third plurality of rows of LEDs 664 within a third area 830. Because the circuit board 660C is flexible, the circuit board 660C can be manipulated so that the second area 820 and the third area 830 each face a horizontal angle away from the first area 810, in similar fashion as to the secondary circuit boards 660B with reference to the main circuit board 660A previously described. Further, the second area 820 and the third area 830 can also be arranged to face a vertical angle away from the first area 810 as well. In addition, one or more refractor assemblies 650 can be fitted over, and adjacent to, the first, second, and third plurality of rows of LEDs 664 in similar fashions as to the other embodiments.

Thus, an improved underwater light is provided by this disclosure. The disclosed underwater light is expected to have improved resistance to impact, improved reliability, and more uniform dissipation of heat generated by lighting elements during operation.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

What is claimed is:

1. An underwater light, comprising:

a housing including a lens, the housing defining a cavity therein; and at least one circuit board positioned within the cavity, the at least one circuit board including an upper row of light-emitting diodes (LEDs), a lower row of LEDs, and a refractor assembly, the refractor assembly including a first refractor and a second refractor, the first refractor and the second refractor each being located adjacent the upper row of LEDs, and a third refractor adjacent the lower row of LEDs, the first refractor and the second refractor positioned to allow light emitted from the upper row of LEDs at a first beam angle to pass through the lens without passing through the refractor assembly and the first beam angle ranging from a first negative degree value to a first positive degree value with respect to a reference plane, and the third refractor positioned to allow light emitted from the lower row of LEDs at a second beam angle to pass through the lens without passing through the refractor assembly, the second beam angle ranging from a second negative degree value to a second positive degree value with respect to the reference plane, wherein the second negative degree value and first negative degree value are not equal.

2. The underwater light of claim 1, wherein the underwater light is configured to produce a plurality of light distributions onto a plurality of regions of a surface, each of the plurality of light distributions having a different red-green-blue (RGB) ratio.

3. The underwater light of claim 1, wherein the first positive degree value and the second positive degree value are substantially equal.

4. The underwater light of claim 1, wherein the second negative degree value has a greater absolute value than the absolute value of the first negative degree value.

5. The underwater light of claim 1, wherein the at least one circuit board further includes a middle row of LEDs and the refractor assembly further includes a fourth refractor and a fifth refractor, the fourth refractor and the fifth refractor positioned to allow light emitted from the middle row of LEDs at a third beam angle to pass through the lens without passing through the refractor assembly, and the third beam angle ranging from a third negative degree value to a third positive degree value with respect to the reference plane.

6. The underwater light of claim 5, wherein the first positive degree value, the second positive degree value, and the third positive degree value are all substantially equal.

7. The underwater light of claim 5, wherein the second negative degree value has a greater absolute value than the absolute value of the first negative degree value and the absolute value of the third negative degree value.

8. An underwater light designed to project light onto a surface, the underwater light comprising:

a housing including a lens; and a first circuit board having a first upper row of light-emitting diodes (LEDs), a first middle row of LEDs, and a first lower row of LEDs, each including one or more red, green, or blue LEDs, the first lower row of LEDs positioned closer to the surface than the first middle row of LEDs and the first upper row of LEDs, and the first middle row of LEDs positioned closer to the surface than the first upper row of LEDs, and the first upper row of LEDs having more red LEDs than the first middle row of LEDs, and the first middle row of LEDs having more red LEDs than the first lower row of LEDs.

9. The underwater light of claim 8, wherein the first upper row of LEDs includes more red LEDs than blue LEDs or green LEDs.

10. The underwater light of claim 8, wherein the first middle row of LEDs includes more blue LEDs than red LEDs or green LEDs.

11. The underwater light of claim 8, wherein the first lower row of LEDs includes an equal number of red LEDs, blue LEDs, and green LEDs.

12. The underwater light of claim 8, further comprising a second circuit board having a second upper row of LEDs, and a second lower row of LEDs, the second lower row of LEDs positioned closer to the surface than the second upper row of LEDs, and the second upper row of LEDs having more red LEDs than the second lower row of LEDs.

13. The underwater light of claim 12, wherein the second upper row of LEDs includes more red LEDs than blue LEDs or green LEDs.

14. The underwater light of claim 12, wherein the second lower row of LEDs includes an equal number of red LEDs, blue LEDs, and green LEDs.

15. The underwater light of claim 12, wherein the second circuit board is angled away from the first circuit board and toward the surface.

16. An underwater light designed to project light onto a surface, the underwater light comprising:

a hermetically-sealed housing; and at least one circuit board including at least one row of light-emitting diodes (LEDs) and at least one refractor, the underwater light configured to produce a first light distribution on a first region of the surface having a first red-green-blue (RGB) ratio, a second light distribution on a second region of the surface having a second RGB ratio, and a third light distribution on a third region of the surface having a third RGB ratio, and the third RGB ratio is a blend RGB ratio falling within a range from the first RGB ratio to a fourth RGB ratio, the fourth RGB ratio including a higher red to blue ratio and red to green ratio than both the first RGB ratio and the second RGB ratio.

17. The underwater light of claim 16, wherein the first region is located at a first distance closer to the underwater light than a second distance of the second region to the underwater light.

18. The underwater light of claim 17, wherein the second RGB ratio includes a higher red to blue and red to green ratio than the first RGB ratio.

19. The underwater light of claim 16, wherein the blend RGB ratio of the third light distribution ranges from a 1-1-1 RGB ratio to a 2-1-1 RGB ratio across the third region of the surface.

20. The underwater light of claim 16, wherein the first RGB ratio is 1-1-1 and the second RGB ratio is 1.5-1-1.

* * * * *